United States Patent
Wang

(10) Patent No.: US 10,872,275 B2
(45) Date of Patent: Dec. 22, 2020

(54) SEMANTIC SEGMENTATION BASED ON A HIERARCHY OF NEURAL NETWORKS

(71) Applicant: Nokia Technologies Oy, Espoo (FI)

(72) Inventor: Tinghuai Wang, Tampere (FI)

(73) Assignee: Nokia Technologies Oy, Espoo (FI)

( * ) Notice: Subject to any disclaimer, the term of this patent is extended or adjusted under 35 U.S.C. 154(b) by 18 days.

(21) Appl. No.: 16/361,433

(22) Filed: Mar. 22, 2019

(65) Prior Publication Data
US 2020/0302239 A1 Sep. 24, 2020

(51) Int. Cl.
G06K 9/00 (2006.01)
G06K 9/62 (2006.01)
G06K 9/46 (2006.01)
G06K 9/72 (2006.01)

(52) U.S. Cl.
CPC ............ *G06K 9/6262* (2013.01); *G06K 9/46* (2013.01); *G06K 9/726* (2013.01)

(58) Field of Classification Search
CPC ....... G06T 7/0069; G06T 7/751; G06T 7/579; G06T 7/50; G06T 5/005; G06T 5/50; G06T 7/20; G06T 7/74; G06T 7/246; G06T 7/277; G06T 7/75; G06T 7/251; G06T 7/248; H04N 13/117; H04N 19/553; H04N 13/00; H04N 19/00; G06K 9/66; G06K 9/00335; G06K 9/00664; G06K 9/3233; G06K 9/4628; G06K 9/6274; G06K 9/6262; G06K 9/46; G06K 9/726
See application file for complete search history.

(56) References Cited

U.S. PATENT DOCUMENTS

| 6,049,793 A * | 4/2000 | Tomita ................. G06K 9/6253 706/17 |
| 2018/0089540 A1 | 3/2018 | Merler et al. |
| 2018/0276825 A1* | 9/2018 | Dai ...................... A61B 5/7267 |
| 2018/0336683 A1* | 11/2018 | Feng .................... G06N 3/0454 |

OTHER PUBLICATIONS

Chen et al., "Semantic Aware Attention Based Deep Object Co-Segmentation", arXiv, Oct. 16, 2018, pp. 1-18.
Chen et al., "DCAN: Deep Contour-Aware Networks for Accurate Gland Segmentation", Computer Vision and Pattern Recognition, Apr. 10, 2016, 10 pages.

(Continued)

*Primary Examiner* — Duy M Dang
(74) *Attorney, Agent, or Firm* — Alston & Bird LLP

(57) ABSTRACT

Aspects described herein relate to various methods, systems and apparatuses that may improve the accuracy of object classifications and object boundary definitions for a semantic segmentation technique. For example, the semantic segmentation technique may be based on a hierarchy of two or more layers. The two or more layers may include neural networks that analyze image data at different resolution scales. Each layer of the hierarchy may determine object boundary features and object class features. Each layer of the hierarchy may share its object boundary features and/or its object class features with one or more other layers in the hierarchy. In turn, each of other layers of the hierarchy may determine its object boundary features and/or its object class features based on the shared features.

20 Claims, 17 Drawing Sheets

(56) References Cited

OTHER PUBLICATIONS

Kang et al., "Attention-Mechanism-Based Tracking Method for Intelligent Internet of Vehicles", International Journal of Distributed Sensor Networks, vol. 14, No. 10, 2018, pp. 1-16.
Mendi et al., "Contour-Based Image Segmentation Using Selective Visual Attention", J. Software Engineering & Applications, vol. 3, No. 8, Aug. 2010, pp. 796-802.
Yang et al., "Attention to Refine Through Multi Scales for Semantic Segmentation", Computer Vision and Pattern Recognition, Jul. 9, 2018, pp. 1-10.
Long et al., "Fully Convolutional Networks for Semantic Segmentation", IEEE Conference on Computer Vision and Pattern Recognition (CVPR), 2015, pp. 3431-3440.
Badrinarayanan et al., "SegNet: A Deep Convolutional Encoder-Decoder Architecture for Image Segmentation", IEEE Transactions on Pattern Analysis and Machine Intelligence, vol. 39, No. 12, Dec. 2017, pp. 2481-2495.
Chen et al., "DeepLab: Semantic Image Segmentation with Deep Convolutional Nets, Atrous Convolution, and Fully Connected CRFs", IEEE Transactions on Pattern Analysis and Machine Intelligence, vol. 40, No. 4, Apr. 2018, pp. 834-848.
Ronneberger et al., "U-net: Convolutional Networks for Biomedical Image Segmentation", arXiv, May 18, 2015, pp. 1-8.
Chen et al., "Encoder-decoder with atrous separable convolution for semantic image segmentation", arXiv, Aug. 22, 2018, pp. 1-18.
Yu et al., "Learning a Discriminative Feature Network for Semantic Segmentation", arXiv, Apr. 25, 2018, pp. 1-10.
Biederman et al., "Surface Versus Edge-Based Determinants of Visual Recognition", Cognitive Psychology, vol. 20, Issue 1, Jan. 1988, pp. 38-64.
Lee et al., "Deeply-Supervised Nets", arXiv, Sep. 25, 2014, pp. 1-10.
"Visual Object Classes Challenge 2012 (VOC2012)", Pascal, Retrieved on Apr. 18, 2019, Webpage available at : http://host.robots.ox.ac.uk/pascal/VOC/voc2012/.
Mostajabi et al., "FeedForward Semantic Segmentation with Zoom-Out Features", 2015 IEEE Conference on Computer Vision and Pattern Recognition (CVPR), Oct. 15, 2015, pp. 3376-3385.
Liu et al., "Parsenet: Looking Wider to See Better", arXiv, 2016, 11 pages.
Zheng et al.,"Conditional Random Fields as Recurrent Neural Networks", arXiv, Apr. 13, 2016, pp. 1-17.
Noh et al., "Learning Deconvolution Network for Semantic Segmentation", arXiv, May 17, 2015, 10 pages.
Liu et al.,"Semantic Image Segmentation via Deep Parsing Network", arXiv, Sep. 24, 2015, 11 pages.
Lin et al., "Efficient Piecewise Training of Deep Structured Models for Semantic Segmentation", IEEE Conf. Computer Vision and Pattern Recognition (CVPR) 2016, Jun. 6, 2016, pp. 1-16.
Ghaisi et al.,"Laplacian Pyramid Reconstruction and Refinement for Semantic Segmentation", arXiv, Jun. 30, 2016, pp. 1-16.
Zhao et al., "Pyramid Scene Parsing Network", arXiv, Apr. 27, 2017, 11 pages.
Zhang et al., "Context Encoding for Semantic Segmentation", arXiv, Mar. 23, 2018, pp. 1-11.
Yu, W. et al., *Hierarchical Semantic Image Matching Using CNN Feature Pyramid*, Computer Vision and Image Understanding 169 (2018) 40-51.
Ding et al., "Context Contrasted Feature and Gated Multi-Scale Aggregation for Scene Segmentation", 2018 IEEE/CVF Conference on Computer Vision and Pattern Recognition (Jun. 2018) pp. 2393-2402.
Extended European Search Report for Application No. 20164110.7 dated Aug. 11, 2020.
Ghiasi et al., "Laplacian Pyramid Reconstruction and Refinement for Semantic Segmentation", 12th European Conference on Computer Vision, ECCV 2012 (2016) 16 pages.
Li et al., "Pyramid Attention Network for Semantic Segmentation", ARXIV.org (2018) pp. 1-13.
Zhu et al., "Cross-Granularity Attention Network for Semantic Segmentation", 2019 IEEE/CVF International Conference on Computer Vision Workshop (Oct. 2019) pp. 1920-1930.

\* cited by examiner

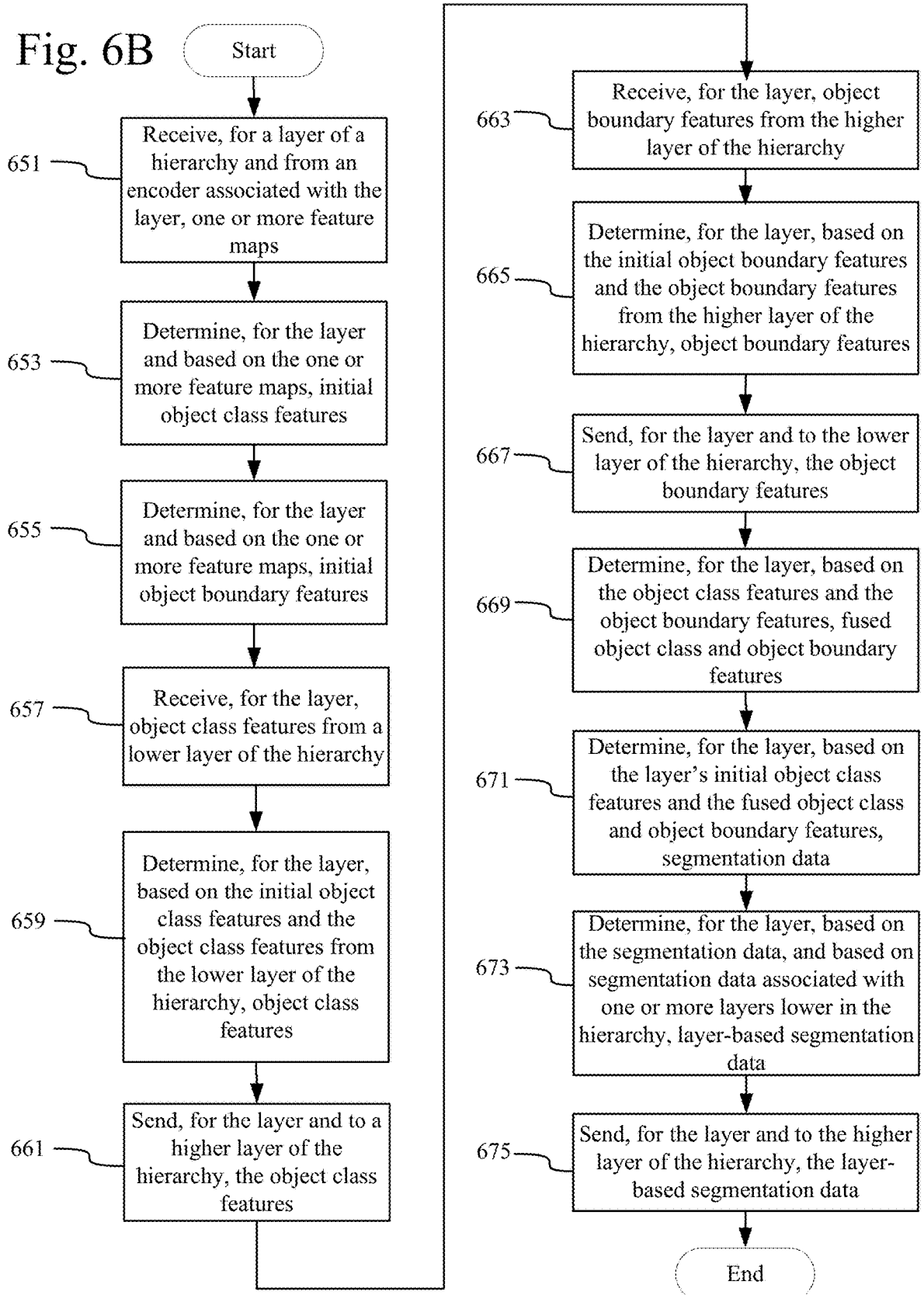

SEMANTIC SEGMENTATION BASED ON A HIERARCHY OF NEURAL NETWORKS

BACKGROUND

Semantic segmentation techniques often process image data to determine a classification for each pixel of the image data. By classifying each pixel, semantic segmentation techniques may be able to determine fine grain inferences of features depicted by the image data, such as object class and object boundary. Convolutional neural networks (CNNs), which are a type of deep learning neural network, are commonly used as part of a semantic segmentation technique. CNN-based semantic segmentation techniques often use a hierarchy of pre-trained CNNs, with each pre-trained CNN being associated with its own layer in the hierarchy. The layers of the hierarchy may analyze the image data at different resolution scales, and may determine features of the image data based on the different resolution scales. Layers higher in the hierarchy may process the image data at higher resolutions. Layers lower in the hierarchy may process the image data at lower resolutions. The features determined by the layers may be combined together to determine segmentation data that assigns each pixel to an object class and the pixel assignments may be grouped to define an object boundary.

BRIEF SUMMARY

This summary is provided to introduce a selection of concepts in a simplified form that are further described below in the Detailed Description. This Summary is not intended to identify key features or essential features of the various embodiments, nor is it intended to be used to limit the scope of the claims.

Aspects described herein relate to various methods, systems and apparatuses that can be used to improve the accuracy of object classifications and object boundary definitions for a semantic segmentation technique. For example, the semantic segmentation technique may be based on a hierarchy of two or more layers. The two or more layers may include neural networks that analyze image data at different resolution scales. Each layer of the hierarchy may determine object boundary features and object class features. Each layer of the hierarchy may share its object boundary features and/or its object class features with one or more other layers in the hierarchy. In turn, each of other layers of the hierarchy may determine its object boundary features and/or its object class features based on the shared features. This process of sharing and determining object boundary features and/or object class features between layers may be referred interchangeably as cross-layer object class and object boundary processing.

Based on one or more aspects described herein, one or more computing devices may receive, for a second layer of a hierarchy of neural networks, one or more feature maps. The one or more computing devices may determine, for the second layer, one or more initial object class features and one or more initial object boundary features. The one or more computing devices may determine, for the second layer, based on the one or more initial object class features and one or more third layer object class features received from a third layer of the hierarchy, one or more object class features. The one or more computing devices may determine, for the second layer, based on the one or more initial object boundary features and one or more first layer object boundary features received from a first layer of the hierarchy, one or more object boundary features. The one or more computing devices may determine, for the second layer, based on the one or more object class features and the one or more object boundary features, one or more fused object class and object boundary features. The one or more computing devices may determine, for the second layer, based on the one or more initial object class features and the one or more fused object class and object boundary features, segmentation data. The one or more computing devices may determine, based on the segmentation data and additional segmentation data associated with the second layer or the third layer, hierarchy-based segmentation data.

BRIEF DESCRIPTION OF THE DRAWINGS

Some example embodiments are illustrated by way of example and not limited in the accompanying figures in which like reference numerals indicate similar elements and in which:

FIGS. 6A and 6B provide example methods for performing semantic segmentation based on a hierarchy of neural networks.

DETAILED DESCRIPTION

Figure 1:
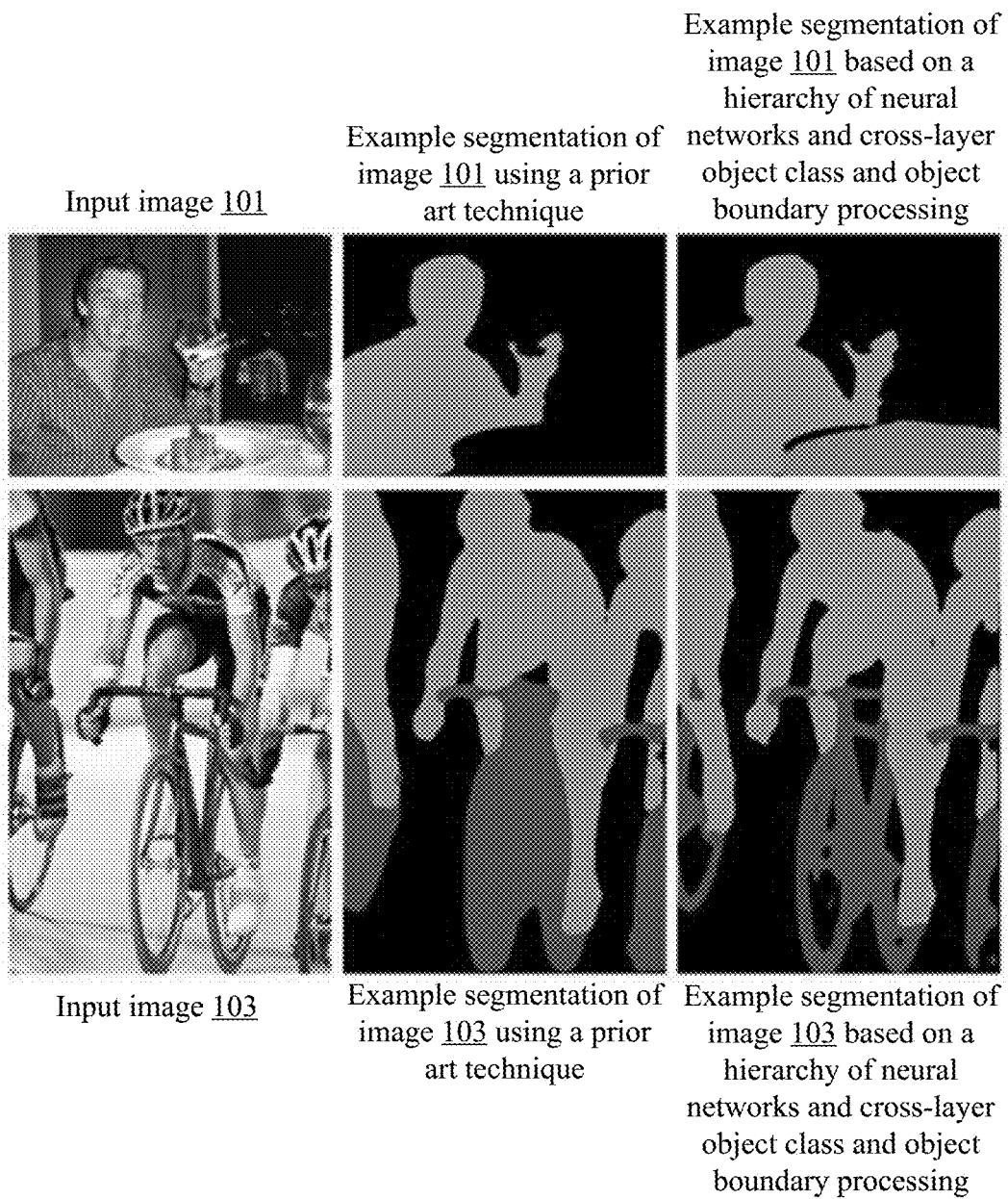
FIG. 1 shows examples of semantic segmentation performed on images.

In the following description of various illustrative embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Many semantic segmentation techniques exhibit inaccurate object classifications and object boundary definitions. A hierarchy of neural networks, such as a hierarchy of CNNs where each CNN is associated with its own layer, can be used to extract object class and object boundary features for semantic segmentation. The hierarchy may be arranged so that the neural networks analyze the image data at different resolution scales. A neural network at a lower layer in the hierarchy may analyze the image data at a lower resolution than a neural network at a higher layer in the hierarchy. A neural network at a higher layer in the hierarchy may analyze the image data at a higher resolution than a neural network at a lower layer in the hierarchy. Due to the different resolution scales, particular neural networks of the hierarchy may be better suited to extract object classifications or object boundary definitions. As compared to lower layers, a neural network at a higher layer may extract less knowledge about object classifications, but may extract more knowledge about object boundary definitions. As compared to higher layers, a neural network at a lower layer may extract more knowledge about object classifications, but extract less knowledge about object boundary definitions.

These differences between the extracted knowledge of the neural networks can be used as a basis for improving the object classifications and object boundary definitions. For example, by sharing and determining object class and object boundary features between layers, object classifications and object boundary definitions may be improved. This process of sharing and determining object class and object boundary features between layers may be referred to as cross-layer object class and object boundary processing. As will be discussed in greater detail below, the cross-layer object class and object boundary processing may allow for a layer to determine its object boundary features based on object boundary features received from another layer higher in the hierarchy. As will also be discussed in greater detail below, the cross-layer object class and object boundary processing may allow for a layer to determine its object class features based on object class features received from another layer lower in the hierarchy. By implementing the cross-layer object class and object boundary processing to improve object classifications and object boundary definitions, the performance of many computer vision applications and/or services can be improved. For example, the performance of semantic segmentation services, smart home services, video conferencing services, Internet-of-Things (IoT) services, and autonomous driving services can be improved by implementing the cross-layer object class and object boundary processing described herein.

FIG. 1 shows examples of semantic segmentation performed on images. For example, FIG. 1 shows image 101 (top row, left column of FIG. 1), an example segmentations of image 101 based on a prior art technique (top row, center column of FIG. 1), and an example segmentation of image 101 based on the aspects described herein (top row, right column of FIG. 1). The differences in the example segmentations of image 101 illustrate how a hierarchy of neural networks and cross-layer object class and object boundary processing can improve semantic segmentation. As one example, the segmentation based on the prior art technique does not include pixel classifications for the "table" object class. The segmentation based on the aspects described herein includes pixel classifications for the "table" object class. By including pixel classifications for the "table" object class, the segmentation of image 101 based on the semantic segmentation aspects described herein exhibits greater accuracy than the segmentation based on the prior art technique.

Also shown by FIG. 1 is image 103 (bottom row, left column of FIG. 1), an example segmentation of image 103 based on a prior art technique (bottom row, center column of FIG. 1), and an example segmentation of image 103 based on the semantic segmentation aspects describes herein (bottom row, right column of FIG. 1). The differences in the example segmentations of image 103 illustrate how a hierarchy of neural networks and cross-layer object class and object boundary processing can improve semantic segmentation. As one example, the segmentation based on the prior art technique includes pixel classifications for a "bicycle" object class that includes areas of the track, which is visible through the bicycle wheel's spokes. The segmentation based on the aspects described herein has a defined boundary between the bicycle wheel and the area of track that is visible through the bicycle wheel's spokes. By defining the boundary between the bicycle wheel and the area of track that is visible through the bicycle wheel's spokes, the segmentation of image 103 based on the aspects described herein exhibits greater accuracy than the segmentation based on the prior art technique.

The example images 101 and 103 illustrate examples of object class features and object boundary features. For example, object class features may, for example, indicate one or more types of object depicted in the data (e.g., a human, a table, a bicycle). Object boundary features may, for example, indicate object edges or object contours (e.g., the edge of the human and the image's background, the contour of the table, the boundary of the bicycle's wheel and the track).

Figure 2:
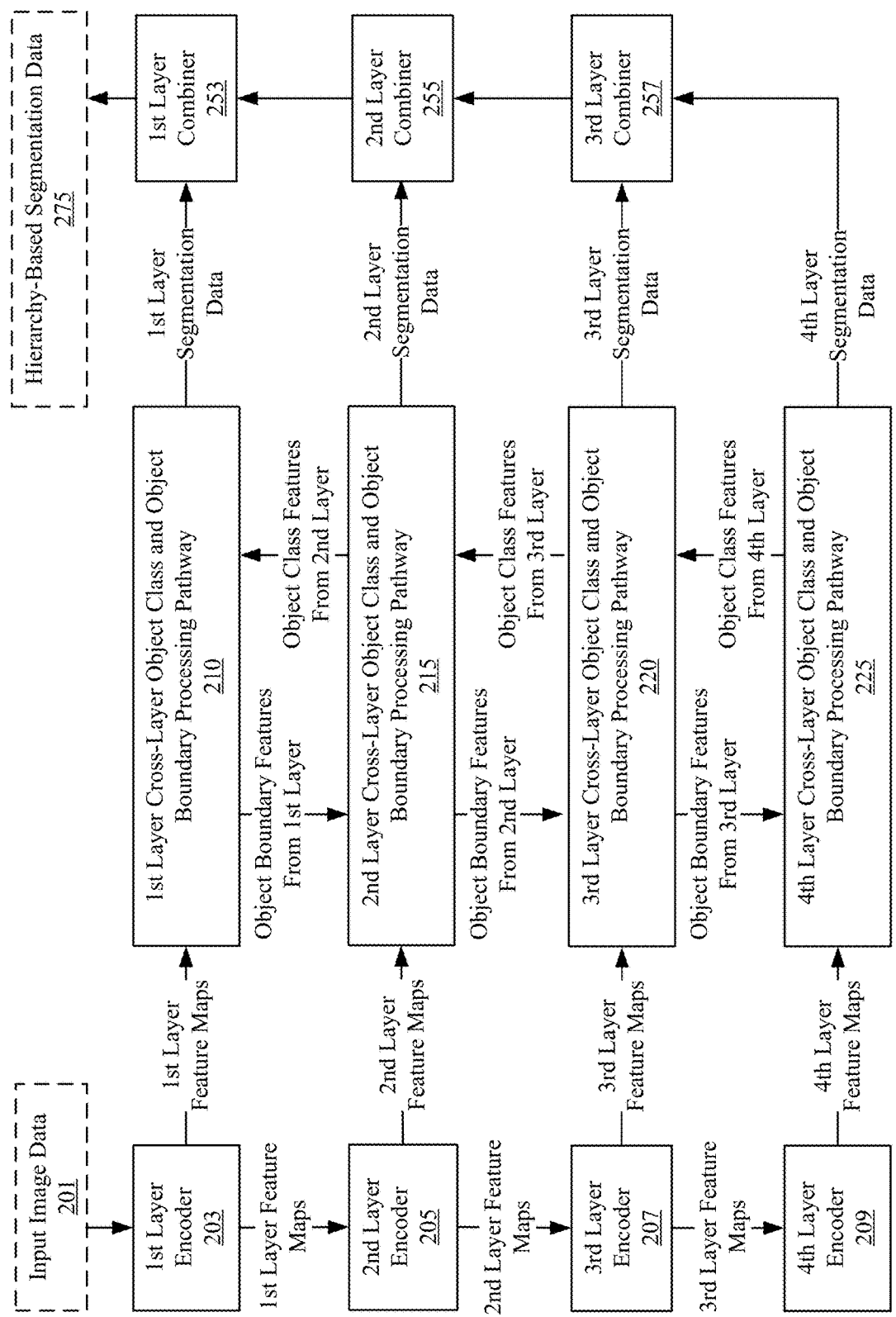
FIG. 2 shows an example block diagram for performing semantic segmentation based on a hierarchy of neural networks.

FIG. 2 shows an example block diagram for performing semantic segmentation based on a hierarchy of neural networks. As shown in FIG. 2, input image data 201 may, as part of a semantic segmentation process, be processed by a hierarchy of layers to determine hierarchy-based segmentation data 275. The input image data 201 may be data of a single image and/or may be based on a frame of video. For example, input image data 201 may be input image 101 or input image 103, as shown in FIG. 1. The input image data 201 may also be a processed version of an image. For example, the input image data 201 may have gone through pre-processing to transform the image data into a format that the first encoder 203 can receive as input. The hierarchy-based segmentation data 275 may depict a semantic segmentation of the input image data where different object classes are depicted using different colored pixels (e.g., orange for a first object class; white for a second object class, red for a third object class, etc.). For example, the hierarchy-based segmentation data may be the example segmentation of image 101 or the example segmentation of image 103, as shown in FIG. 1. The input image data 201 and the hierarchy-based segmentation data 275 may be of the same resolution (e.g., both the input image data 201 and the hierarchy-based segmentation data 275 may have a resolution of 572 pixels by 572 pixels).

FIG. 2 shows an example hierarchy of four layers. The number of layers may vary by implementation (e.g., a hierarchy of layers may include two or more layer). Throughout this disclosure, examples will be discussed based on the example hierarchy of four layers. As shown in FIG. 2, each of the four layers may include its own encoder (203, 205, 207, and 209); and may include its own cross-layer object class and object boundary processing (e.g., pathways 210, 215, 220, and 225). The first through the third layers may each include a combiner (253, 255, and 257). The first layer is considered to be the highest layer of the hierarchy. The fourth layer is considered to be the lowest layer of the hierarchy.

Encoders 203, 205, 207, and 209 may each include its own neural network configured to receive, as input, image data of a certain resolution and generate, as output, one or more feature maps based on the image data. Encoders 203, 205, and 207 may each be configured to forward its one or more feature maps to the encoder immediately lower in the hierarchy. For example, the first layer encoder 203 may be configured to forward one or more first layer feature maps to the second layer encoder 205; the second layer encoder 205 may be configured to forward one or more second layer feature maps to the third layer encoder 207; and the third layer encoder 207 may be configured to forward one or more second layer feature maps to the fourth layer encoder 209.

Encoders 203, 205, 207, and 209 may each be configured to forward its one or more feature maps to its respective cross-layer object class and object boundary processing pathway 210, 215, 220, and 225. For example, the first layer encoder 203 may be configured to forward one or more first layer feature maps to the first layer cross-layer object class and object boundary processing pathway 210; the second layer encoder 205 may be configured to forward one or more second layer feature maps to the second layer cross-layer object class and object boundary processing pathway 215; the third layer encoder 207 may be configured to forward one or more third layer feature maps to the third layer cross-layer object class and object boundary processing pathway 220; and the fourth layer encoder 209 may be configured to forward one or more fourth layer feature maps to the fourth layer cross-layer object class and object boundary processing pathway 225.

The neural network of each encoder 203, 205, 207, and 209 may be or include a convolutional neural network (CNN) or some other type of deep learning neural network. Each CNN may have been trained using known techniques including, for example, a supervised training process for CNNs. The training of the CNNs can be performed by a computing device that is configured to perform a service that uses the hierarchy. Alternatively, the training of the CNNs can be performed by a server that sends the pre-trained CNNs to the computing device. A CNN may include an input layer configured to receive, as input, a three-dimensional matrix of values. For example, an input layer (e.g., the input layer of a CNN for the first layer encoder 203) may be configured to receive the input image data 201 as a three-dimensional matrix of values, with the resolution of the input image data 201 forming the first two dimensions, and color information of a pixel forming the third dimension. As another example, an input layer (e.g., the input layers of a CNN for encoders 205, 207, and 209) may be configured to receive, as input, one or more feature maps from an encoder higher in the hierarchy. Each CNN may include one or more hidden layers configured to perform one or more transformations on the input, such as convolution operations and pooling operations. For example, the one or more hidden layers may include one or more convolutional layers that are each configured to apply a convolution operation and pass the result onto the next layer of the CNN. The one or more hidden layers may include one or more pooling layers that are each configured to apply a pooling operation that reduces the dimensions of the input. The CNN may include an output layer configured to generate, as output, the one or more feature maps, which represent the result of the operations performed by the hidden layers of the CNN.

Due to any pooling operations performed by the CNN, the one or more feature maps may be at a resolution that is less than the resolution of the input of the CNN. In this way, the encoders 203, 205, 207, and 209 may be configured to generate feature maps of successively reduced resolution. For example, if the input image data 201 is at full resolution, the first layer encoder 203 may be configured to generate one or more feature maps at ½ the full resolution. The second layer encoder 205 may be configured to generate one or more feature maps at ¼ the full resolution. The third layer encoder 207 may be configured to generate one or more feature maps at ⅛ the full resolution. The fourth layer encoder 209 may be configured to generate one or more feature maps at 1/16 the full resolution. Further, encoders 203, 205, 207, and 209 may be configured to receive, as input, data at successively reduced resolution. For example, encoder 203 may be configured to receive, as input, the input image data 201 at the full resolution. Encoder 205 may be configured to receive, as input, the first layer feature maps, which may be at ½ the full resolution. Encoder 207 may be configured to receive, as input, the second layer feature maps, which may be at ¼ the full resolution. Encoder 209 may be configured to receive, as input, the third layer feature maps, which may be at ⅛ the full resolution.

The one or more feature maps generated by an encoder may include, for example, an object class feature map that indicates predictions of object class and an object boundary feature map that indicates predictions of object boundaries (e.g., encoder 203 may generate a first layer object class feature map and a first layer object boundary feature map; encoder 205 may generate a second layer object class feature map and a second layer object boundary feature map). The object class feature map may be in three dimensions. The resolution of the object class feature map may form the first two dimensions, and the number of object classes than can be predicted by the encoder may form the third dimensions. For example, if the resolution of the object class feature map is 256 by 256, and the encoder can form predictions for 15 object classes, the dimensions of the object class feature map may be 256 by 256 by 15. The object boundary feature map may be in two dimensions.

Cross-layer object class and object boundary processing pathways 210, 215, 220, and 225 may be configured to process feature maps and generate, as output, segmentation data that indicates, for the respective layer, predictions of object class and object boundaries. For simplicity, the cross-layer object class and object boundary processing pathways 210, 215, 220, and 225 may be referred herein as cross-layer pathways 210, 215, 220, and 225. The details of the processing performed by the cross-layer pathways 210, 215, 220, and 225 are discussed below (e.g., FIGS. 3A-3D and FIGS. 4A-4C). In general, each cross-layer pathway 210, 215, 220, and 225, may process the one or more feature maps generated by its respective encoder based on object class features received from a lower layer in the hierarchy and based on object boundary features received from a higher layer in the hierarchy. Thus, as shown in FIG. 2, the first layer's cross-layer pathway 210, which is located in the highest layer of the hierarchy, may process the one or more first layer' feature maps based on object class features received from the second layer. The second layer's cross-layer pathway 215 may process the one or more second layer feature maps based on object class features received from the third layer and based on object boundary features received from the first layer. The third layer's cross-layer pathway 220 may process the one or more third layer feature maps based on object class features received from the fourth layer and based on object boundary features received from the second layer. The fourth layer's cross-layer pathway 225, which is located in the lowest layer of the hierarchy, may process the one or more fourth layer feature maps based on object boundary features received from the third layer.

The segmentation data generated as output by the cross-layer pathways 210, 215, 220, and 225 may be forwarded to combiners 253, 255, and 257. The combiners 253, 255, and 257 may be configured to combine segmentation data together and forward the combined segmentation data higher in the hierarchy until each layer's segmentation data has been combined. Combining two layers of segmentation data may include, for example, upscaling segmentation data and/or concatenating the segmentation data together. For example, as shown in FIG. 2, the third layer combiner 257 may be configured to receive the third layer segmentation data and the fourth layer segmentation data; concatenate the third layer segmentation data and the fourth layer segmentation data together; upscale the concatenated segmentation data; and forward the resulting data to the second layer combiner 255. The second layer combiner 255 may be configured to receive the resulting data of the third layer combiner 257 and the second layer segmentation data; concatenate the second layer segmentation data and the resulting data of the third layer combiner 257 together; upscale the concatenated segmentation data; and forward the resulting data to the first layer combiner 253. The first layer combiner may be configured to receive the resulting data of the second layer combiner 255 and the first layer segmentation data; concatenate the first layer segmentation data and the resulting data of the second layer combiner 255 together; upscale the concatenated segmentation data; and output the resulting data as the hierarchy-based segmentation data 275. As a result of the upscaling and/or concatenation, the hierarchy-based segmentation data 275 may be of the same resolution of the input image data 201.

Figure 5A:
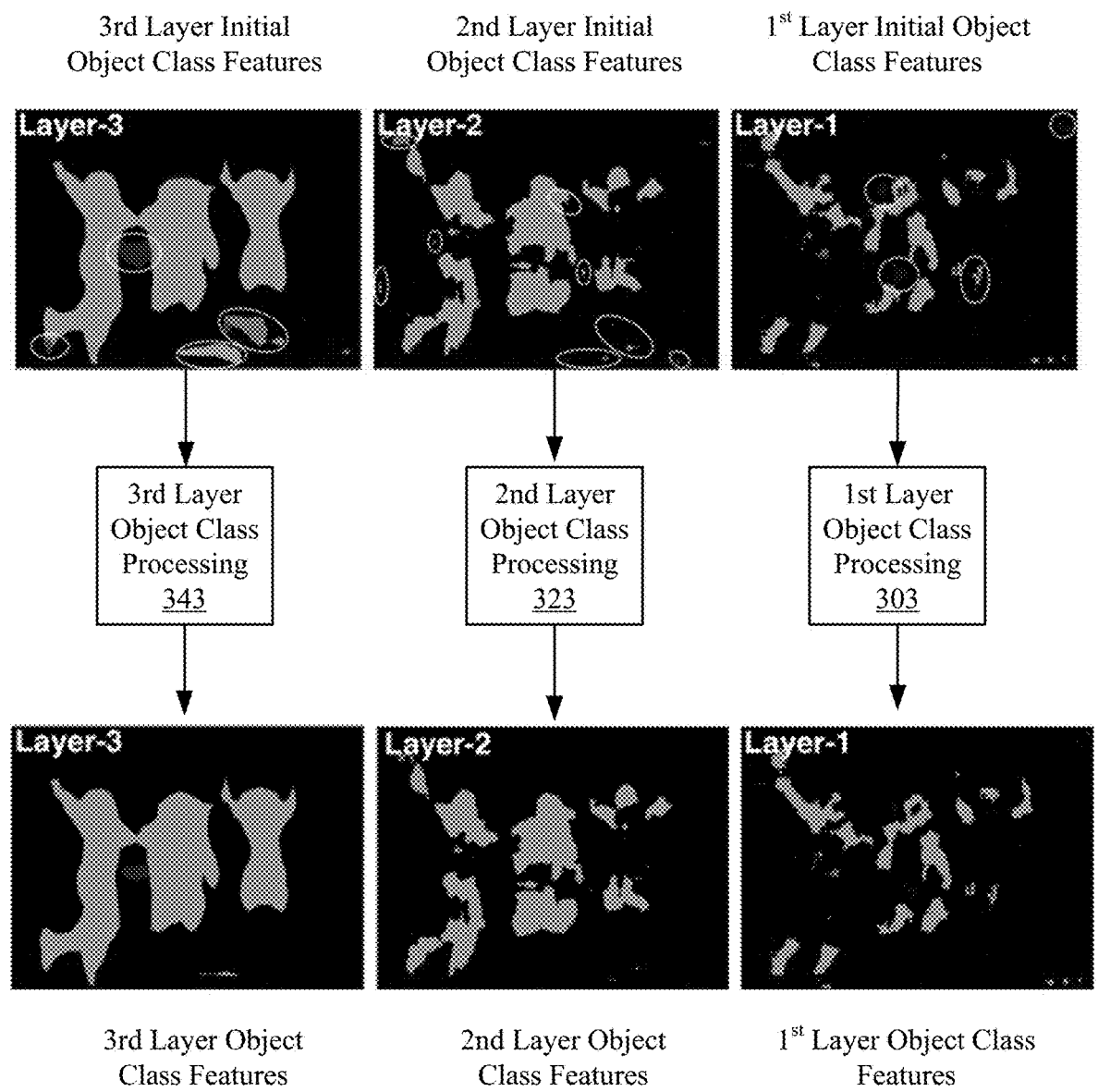
FIGS. 5A and 5B show example object class features and object boundary features.
Figure 5B:
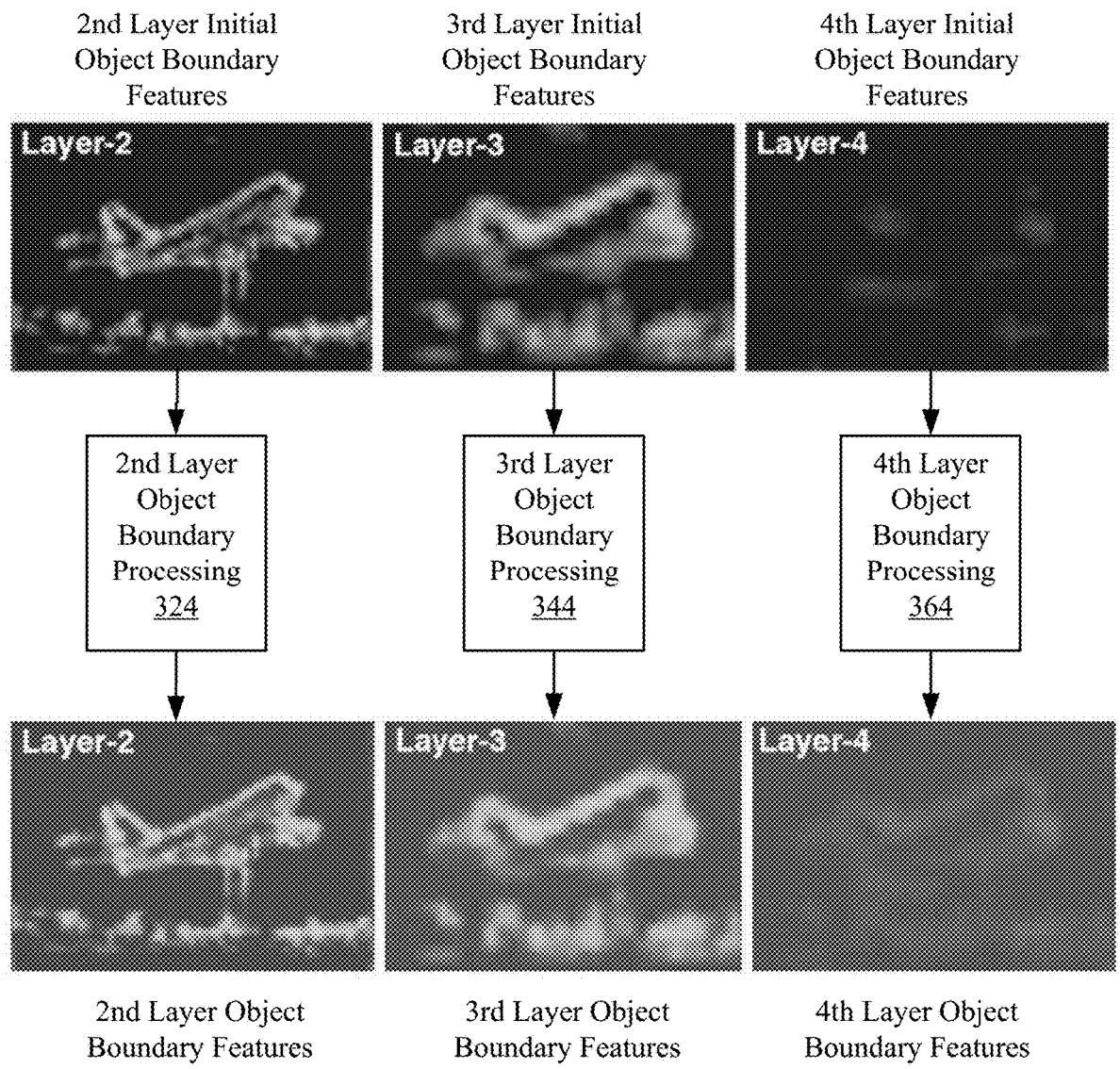
Figure 6A:
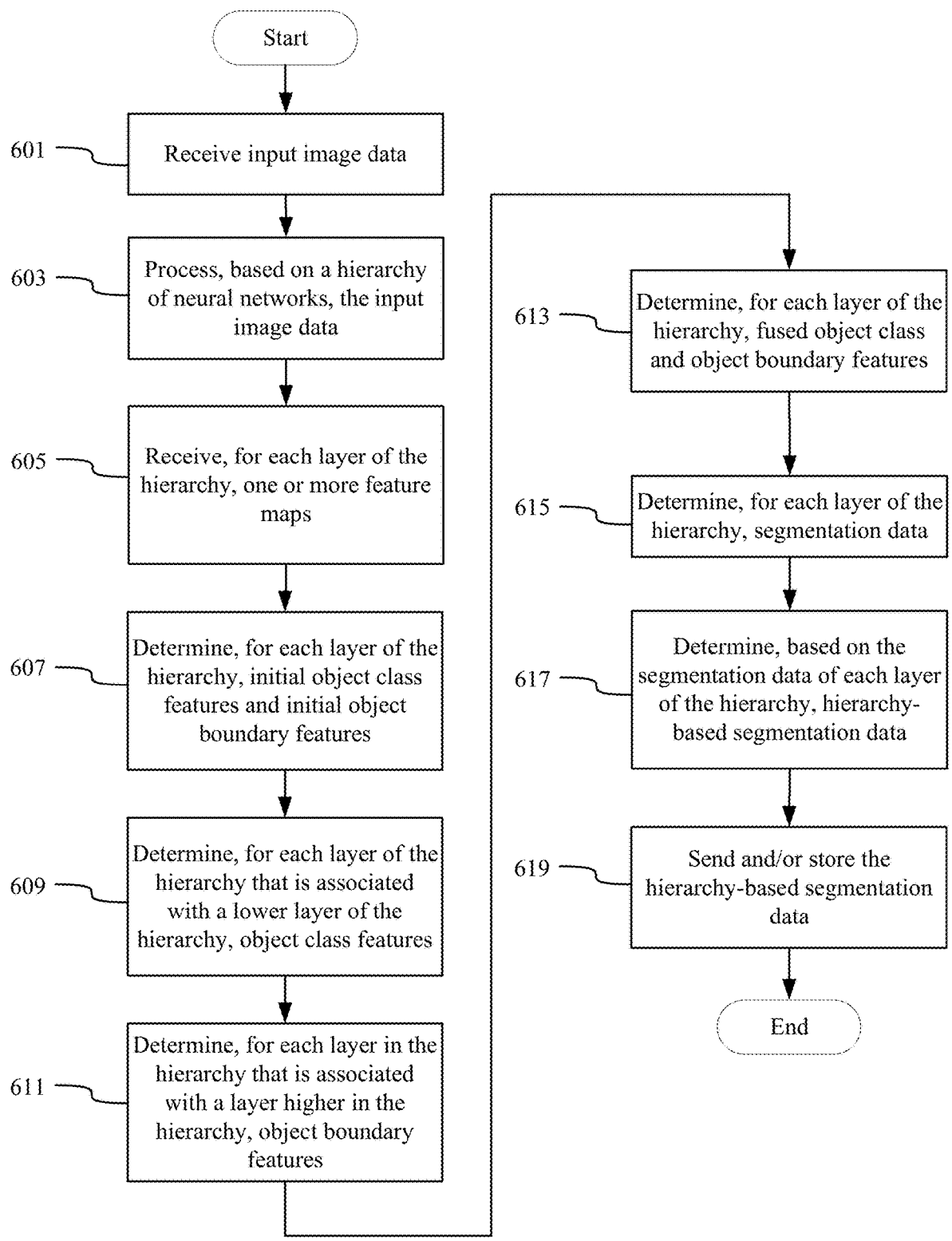
Figure 7:
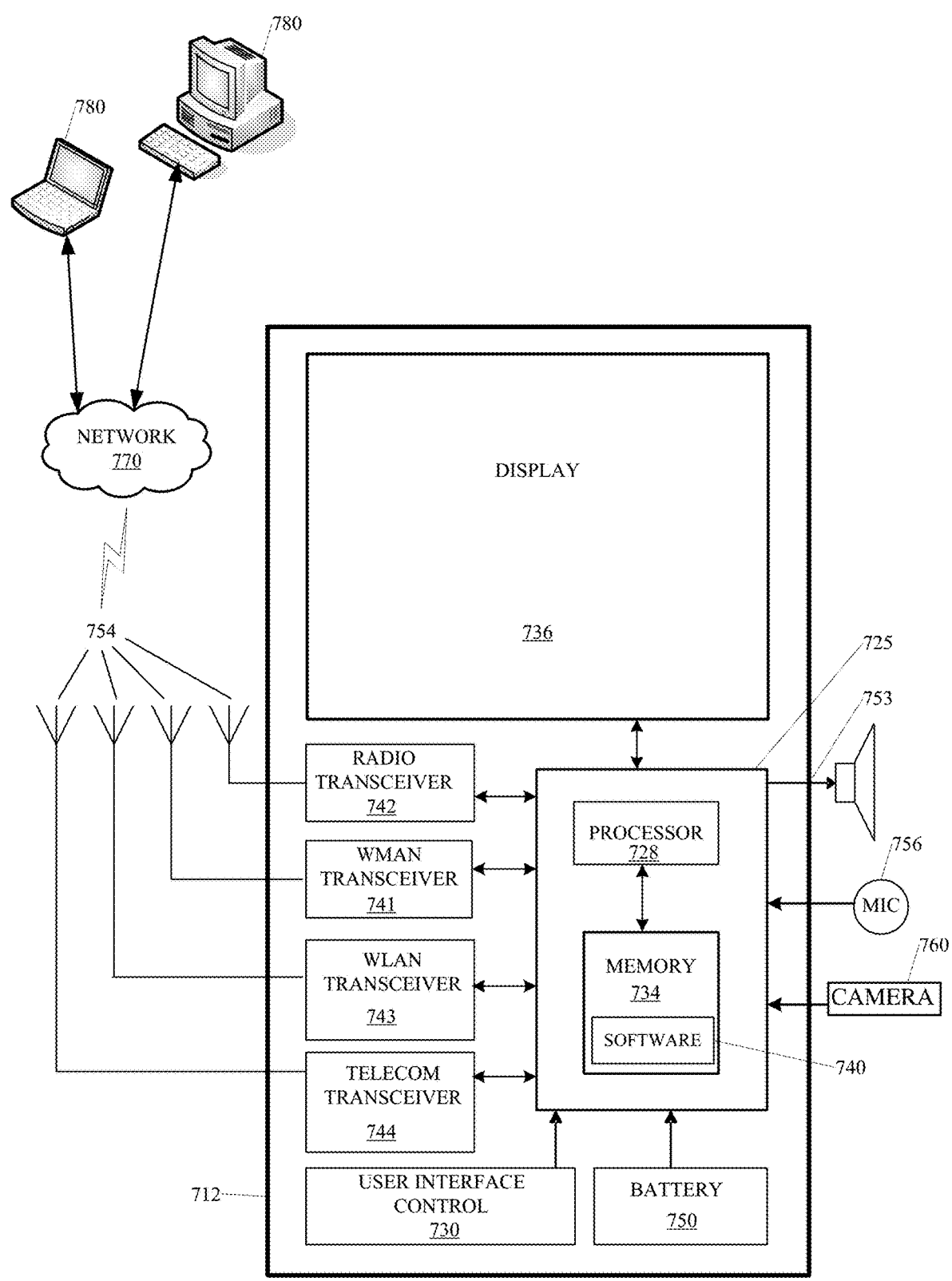
FIG. 7 shows an example apparatus that may be used to implement one or more aspects described herein.
Figure 8A:
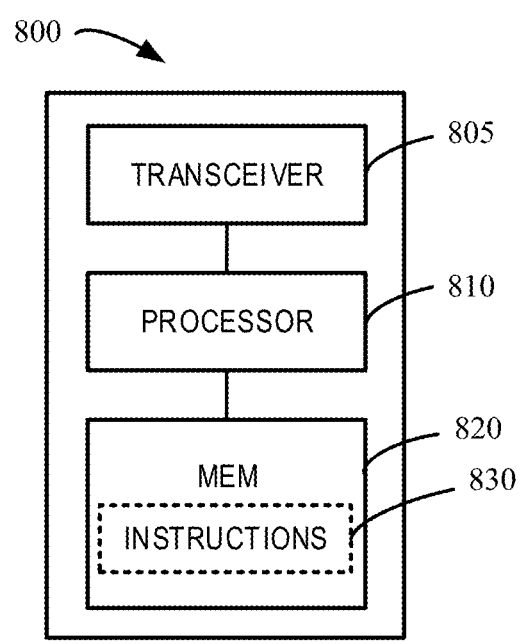
FIGS. 8A and 8B show additional example apparatuses or devices that may be used to implement one or more aspects described herein.
Figure 8B:
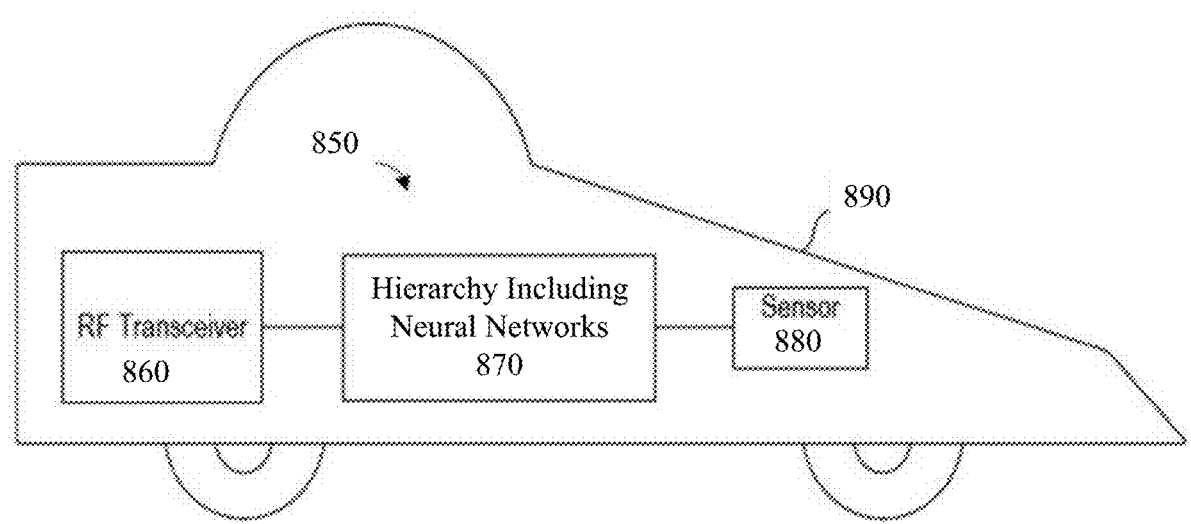
Figure 9:
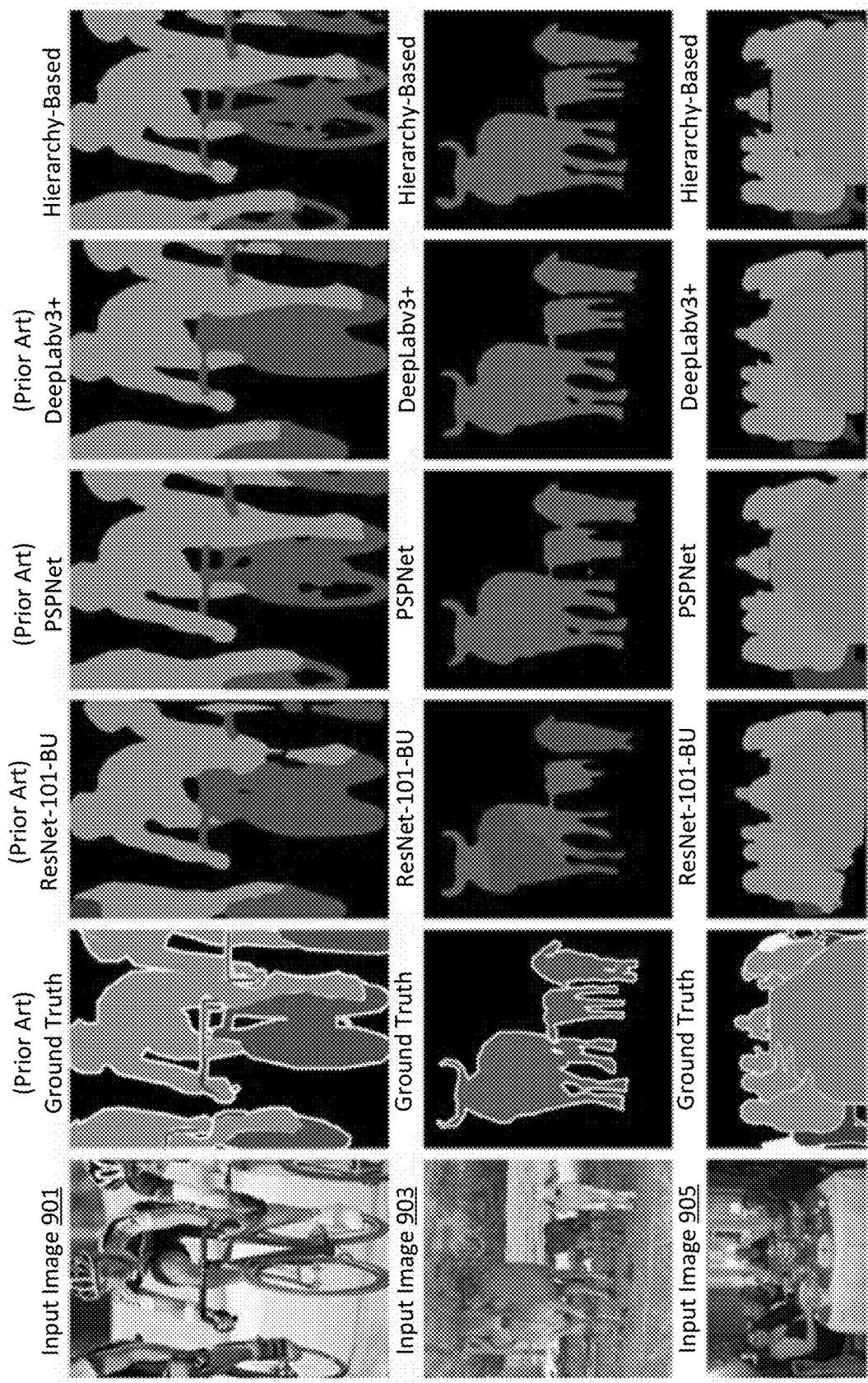
FIG. 9 shows additional examples of semantic segmentation performed on images.

The above discussion regarding FIG. 2 provides an introduction to the examples and various features described throughout this disclosure. Additional details on the above aspects, as well as further aspects, will be discussed below in the remaining figures. As a brief overview, FIGS. 3A-3D and 4A-4C show additional details on the processing performed by the cross-layer pathways 210, 215, 220, and 225. FIGS. 5A-5B show examples of object class features and object boundary features that may be generated by cross-layer pathways 210, 215, 220, and 225. FIGS. 6A and 6B provide example methods for performing semantic segmentation based on a hierarchy similar to the arrangement(s) depicted in FIGS. 2, 3A-3D, and 4A-4C. FIGS. 7, 8A, and 8B show example apparatuses that may be used to implement all or a portion of a hierarchy similar to those discussed in connection with FIGS. 2, 3A-4D, 4A-4C, 5A-5B, and 6A-6B. FIG. 9 illustrates additional examples of segmentation data, some of which is generated by other techniques and some of which may be generated by a hierarchy similar to those discussed in connection with FIGS. 2, 3A-4D, 4A-4C, 5A-5B, and 6A-6B.

Figure 3A:
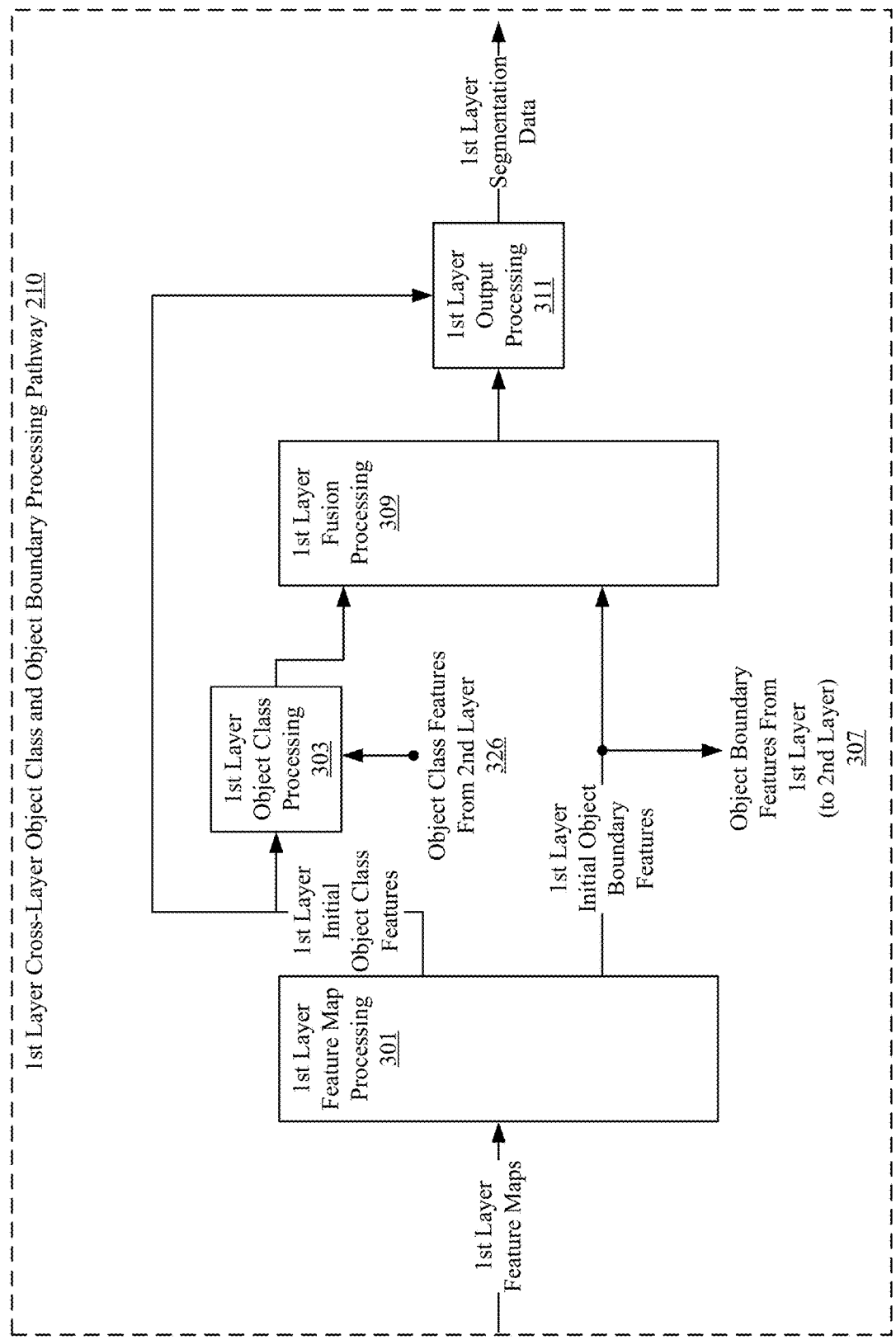
FIGS. 3A-3D show example block diagrams for performing cross-layer object class and object boundary processing.
Figure 3B:
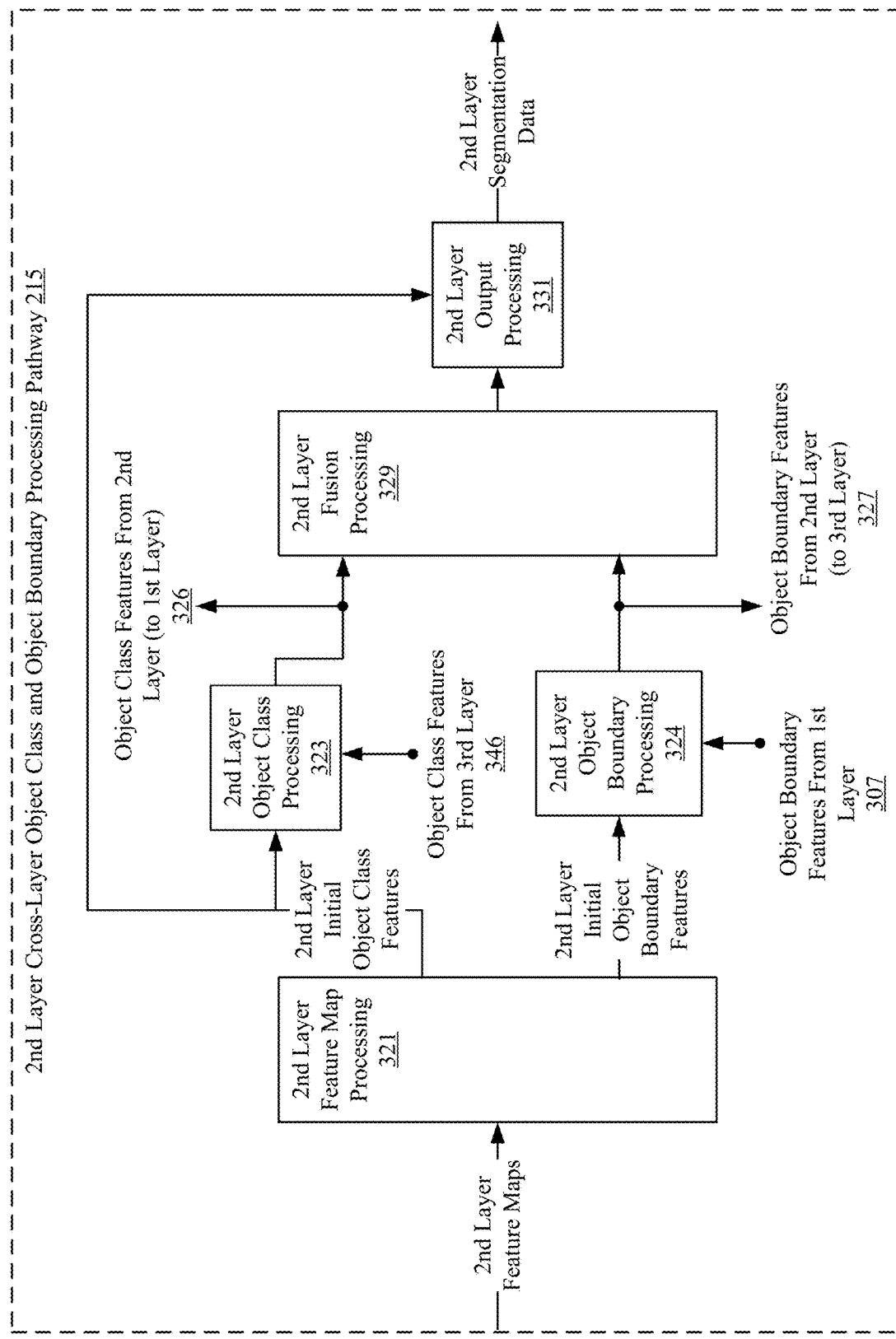
Figure 3C:
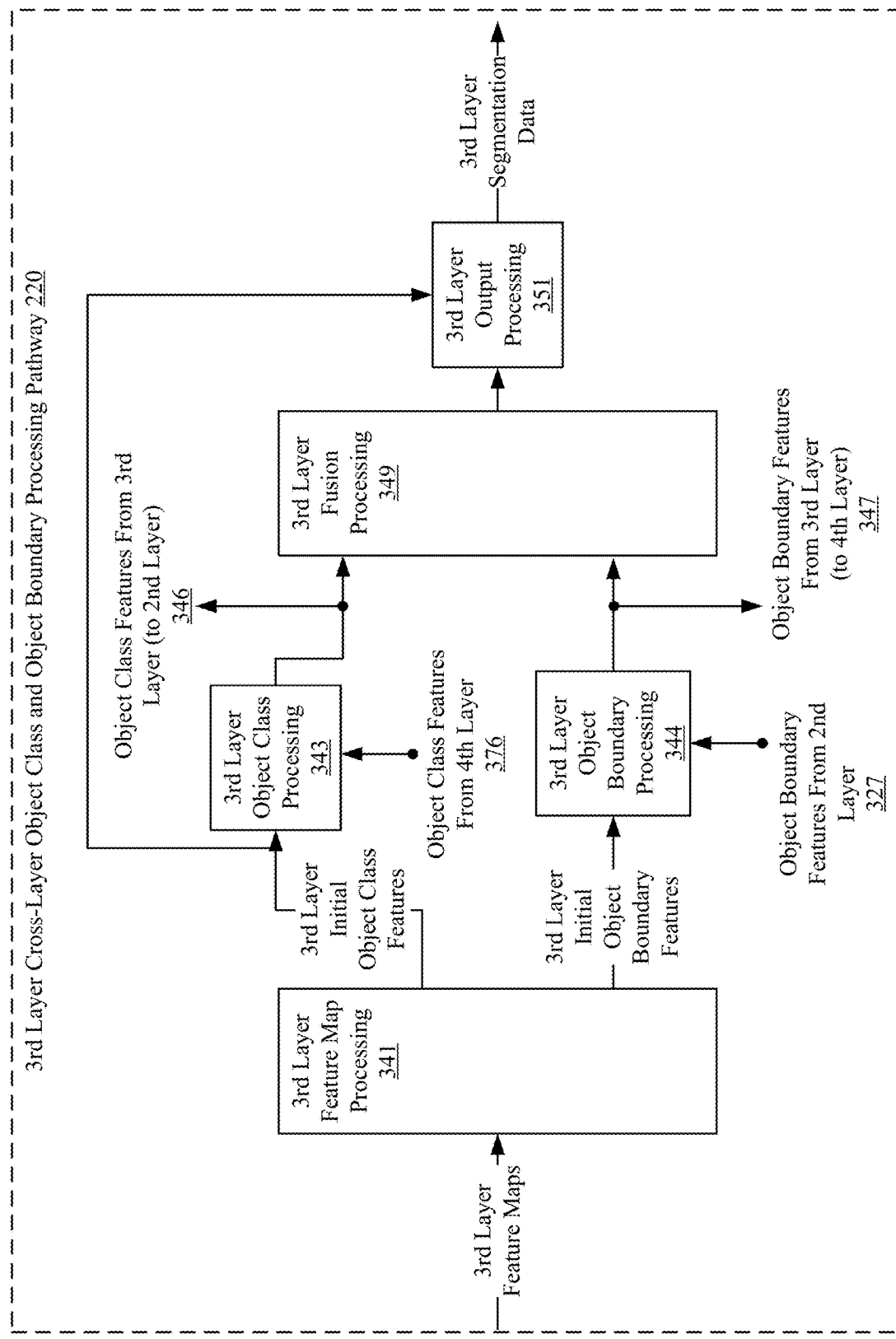
Figure 3D:
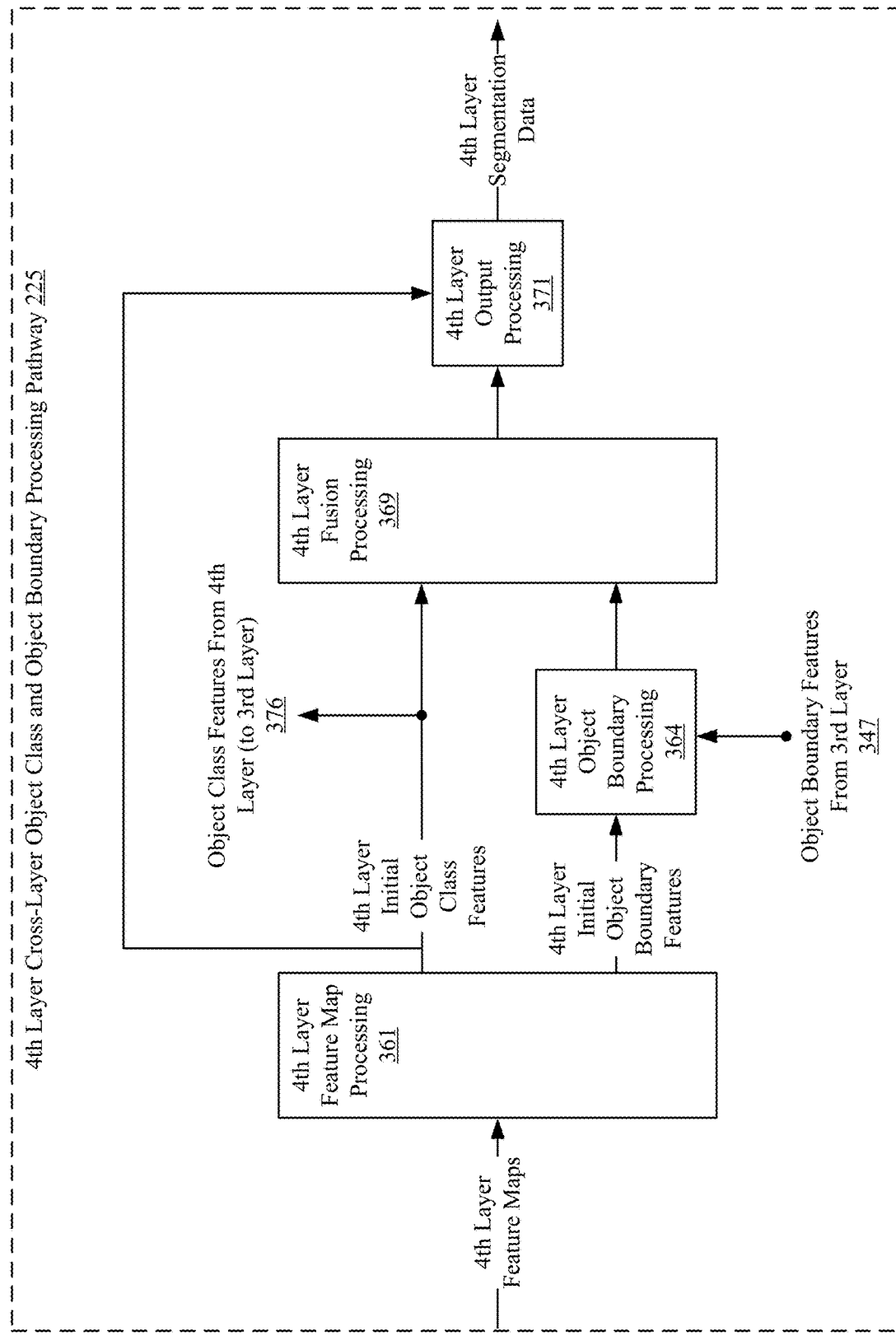

FIGS. 3A-3D show example block diagrams for performing cross-layer object class and object boundary processing. Further, FIGS. 3A-3D show additional details of the cross-layer pathways 210, 215, 220, and 225. FIG. 3A shows additional details of the first layer's cross-layer pathway 210. FIG. 3B shows additional details of the second layer's cross-layer pathway 215. FIG. 3C shows additional details of the third layer's cross-layer pathway 220. FIG. 3D shows additional details of the fourth layer's cross-layer pathway 225. It is noted that any of the features determined based on the hierarchy (e.g., object class features, initial object class features, object boundary features, initial object boundary features, and the like), could be referred to as one or more features (e.g., one or more object class features, one or more initial object class features, one or more object boundary features, one or more initial object boundary features, and the like). For simplicity, the "one or more" is omitted from the discussed examples.

Beginning with FIG. 3A, the first layer's cross-layer pathway 210 is shown as being configured to receive, as input, the one or more first layer feature maps and generate, as output, the first layer segmentation data. The first layer's cross-layer pathway 210 may include first layer feature map processing 301 that is configured to process the one or more first layer feature maps to generate first layer initial object class features and first layer initial object boundary features. The first layer feature map processing 301 may be configured to perform its processing based on the format of the one or more first layer feature maps. For example, if the one or more first layer feature maps includes an object class feature map and an object boundary feature map, the first layer feature map processing 301 may be configured to separate the two feature maps from each other; forward the object class feature map as the first layer initial object class feature map; and forward the object boundary feature map as the first layer initial object boundary feature map. As another example, if the one or more first layer feature maps includes a concatenation of object class features and object boundary features, the first layer feature map processing 301 may be configured to extract the object class features and the object boundary features; forward the object class feature map as the first layer initial object class feature map; and forward the object boundary feature map as the first layer initial object boundary feature map.

The first layer initial object class features and the first layer initial object boundary features are shown in FIG. 3A as being processed along their own pathway. In this way, the first layer initial object class features may be processed by first layer object class processing 303. The first layer initial object boundary features, as a result of the first layer being the highest layer of the hierarchy, may be processed by the first layer fusion processing 309.

The first layer object class processing 303 may be configured to receive the first layer initial object class features and, as shown via 326, object class features from the second layer. The first layer object class processing 303 may be configured to process the first layer initial object class features based on the object class features from the second layer. Details of this process is provided in FIG. 4A. In general, the first layer initial object class processing 303 may be configured to determine weights based on the object class features from the second layer, and determine first layer object class features based on the weights and the first layer initial object class features. The first layer object class features may be provided to the first layer fusion processing 309.

The first layer fusion processing 309 may be configured to receive the first layer object class features; receive the first layer initial object boundary features; and determine first layer fused object class and boundary features. Details of this process is provided in FIG. 4C. In general, the first layer fusion processing 309 may be configured to determine weights based on the first layer initial object boundary features, and determine the first layer fused object class and object boundary features based on the weights and the first layer object class features. The first layer fused object class and object boundary features may be provided to the first layer output processing 311.

The first layer output processing 311 may be configured to receive the first layer fused object class and object boundary features; receive the first layer initial object class features; and determine the first layer segmentation data. The first layer segmentation data may be determined, for example, by summing the first layer fused object class and object boundary features and the first layer initial object class features. The first layer segmentation data may be provided as output from the first layer's cross-layer pathway 210 and to the first layer combiner 253 (not shown).

The first layer's cross-layer pathway 210 may also be configured to provide object boundary features to a lower layer. Thus, as shown via 307, the first layer's cross-layer pathway 210 is shows as being configured to provide the first layer initial object features to the second layer.

Continuing at FIG. 3B, the second layer's cross-layer pathway 215 is shown as being configured to receive, as input, the one or more second layer feature maps and generate, as output, the second layer segmentation data. The second layer's cross-layer pathway 215 may include second layer feature map processing 321 that is configured to process the one or more second layer feature maps to generate second layer initial object class features and second layer initial object boundary features. The second layer feature map processing 321 may be configured to perform its processing based on the format of the one or more second layer feature maps. For example, if the one or more second layer feature maps includes an object class feature map and an object boundary feature map, the second layer feature map processing 321 may be configured to separate the two feature maps from each other; forward the object class feature map as the second layer initial object class feature map; and forward the object boundary feature map as the second layer initial object boundary feature map. As another example, if the one or more second layer feature maps includes a concatenation of object class features and object boundary features, the second layer feature map processing 321 may be configured to extract the object class features and the object boundary features; forward the object class feature map as the second layer initial object class feature map; and forward the object boundary feature map as the second layer initial object boundary feature map.

The second layer initial object class features and the second layer initial object boundary features are shown in FIG. 3B as being processed along their own pathway. In this way, the second layer initial object class features may be processed by second layer object class processing 323. The second layer initial object boundary features may be processed by second layer object class processing 324.

The second layer object class processing 323 may be configured to receive the second layer initial object class features and, as shown via 346, object class features from the third layer. The second layer object class processing 323 may be configured to process the second layer initial object class features based on the object class features from the third layer. Details of this process is provided in FIG. 4A. In general, the second layer initial object class processing 323 may be configured to determine weights based on the object class features from the third layer, and determine second layer object class features based on the weights and the second layer initial object class features. The second layer object class features may be provided to the second layer fusion processing 329.

The second layer object boundary processing 324 may be configured to receive the second layer initial object boundary features and, as shown via 307, the object boundary features from the first layer. The second layer object boundary processing 324 may be configured to process the second layer initial object boundary features based on the object boundary features from the first layer. Details of this process is provided in FIG. 4B. In general, the second layer initial object boundary processing 324 may be configured to determine weights based on the object boundary features from the first layer, and determine object boundary features based on the weights and the second layer initial object boundary features. The second layer object boundary features may be provided to the second layer fusion processing 329.

The second layer fusion processing 329 may be configured to receive the second layer object class features; receive the second layer object boundary features; and determine second layer fused object class and boundary features. Details of this process is provided in FIG. 4C. In general, the second layer fusion processing 329 may be configured to determine weights based on the second layer object boundary features, and determine the second layer fused object class and object boundary features based on the weights and the second layer object class features. The second layer fused object class and object boundary features may be provided to the second layer output processing 331.

The second layer output processing 331 may be configured to receive the second layer fused object class and object boundary features; receive the second layer initial object class features; and determine the second layer segmentation data. The second layer segmentation data may be determined, for example, by summing the second layer fused object class and object boundary features and the second layer initial object class features. The second layer segmentation data may be provided as output from the second layer's cross-layer pathway 215 and to the second layer combiner 255 (not shown).

The second layer's cross-layer pathway 215 may also be configured to provide object boundary features to a lower layer and provide object class features to a higher layer. Thus, as shown via 326, the second layer's cross-layer pathway 215 is shown as being configured to provide the second layer object class features to the first layer. As shown via 327, the second layer's cross-layer pathway 215 is shown as being configured to provide the second layer object boundary features to the third layer.

Continuing at FIG. 3C, the third layer's cross-layer pathway 220 is shown as being configured to receive, as input, the one or more third layer feature maps and generate, as output, the third layer segmentation data. The third layer's cross-layer pathway 220 may include third layer feature map processing 341 that is configured to process the one or more third layer feature maps to generate third layer initial object class features and third layer initial object boundary features. The third layer feature map processing 341 may be configured to perform its processing based on the format of the one or more third layer feature maps. For example, if the one or more third layer feature maps includes an object class feature map and an object boundary feature map, the third layer feature map processing 341 may be configured to separate the two feature maps from each other; forward the object class feature map as the third layer initial object class feature map; and forward the object boundary feature map as the third layer initial object boundary feature map. As another example, if the one or more third layer feature maps includes a concatenation of object class features and object boundary features, the third layer feature map processing 341 may be configured to extract the object class features and the object boundary features; forward the object class feature map as the third layer initial object class feature map; and forward the object boundary feature map as the third layer initial object boundary feature map.

The third layer initial object class features and the third layer initial object boundary features are shown in FIG. 3C as being processed along their own pathway. In this way, the third layer initial object class features may be processed by third layer object class processing 343. The third layer initial object boundary features may be processed by third layer object class processing 344.

The third layer object class processing 343 may be configured to receive the third layer initial object class features and, as shown via 376, object class features from the fourth layer. The third layer object class processing 343 may be configured to process the third layer initial object class features based on the object class features from the fourth layer. Details of this process is provided in FIG. 4A. In general, the third layer initial object class processing 343 may be configured to determine weights based on the object class features from the fourth layer, and determine third layer object class features based on the weights and the third layer initial object class features. The third layer object class features may be provided to the third layer fusion processing 349.

The third layer object boundary processing 344 may be configured to receive the third layer initial object boundary features and, as shown via 327, the object boundary features from the second layer. The third layer object boundary processing 344 may be configured to process the third layer initial object boundary features based on the object boundary features from the second layer. Details of this process is provided in FIG. 4B. In general, the third layer initial object boundary processing 344 may be configured to determine weights based on the object boundary features from the second layer, and determine object boundary features based on the weights and the third layer initial object boundary features. The third layer object boundary features may be provided to the third layer fusion processing 349.

The third layer fusion processing 349 may be configured to receive the third layer object class features; receive the third layer object boundary features; and determine third layer fused object class and boundary features. Details of this process is provided in FIG. 4C. In general, the third layer fusion processing 349 may be configured to determine weights based on the third layer object boundary features, and determine the third layer fused object class and object boundary features based on the weights and the third layer object class features. The third layer fused object class and object boundary features may be provided to the third layer output processing 351.

The third layer output processing 351 may be configured to receive the third layer fused object class and object boundary features; receive the third layer initial object class features; and determine the third layer segmentation data. The third layer segmentation data may be determined, for example, by summing the third layer fused object class and object boundary features and the third layer initial object class features. The third layer segmentation data may be provided as output from the third layer's cross-layer pathway 220 and to the third layer combiner 257 (not shown).

The third layer's cross-layer pathway 220 may also be configured to provide object boundary features to a lower layer and provide object class features to a higher layer. Thus, as shown via 346, the third layer's cross-layer pathway 220 is shown as being configured to provide the third layer object class features to the second layer. As shown via 347, the third layer's cross-layer pathway 220 is shown as being configured to provide the third layer object boundary features to the fourth layer.

Continuing at FIG. 3D, the fourth layer's cross-layer pathway 225 is shown as being configured to receive, as input, the one or more fourth layer feature maps and generate, as output, the fourth layer segmentation data. The fourth layer's cross-layer pathway 225 may include fourth layer feature map processing 361 that is configured to process the one or more fourth layer feature maps to generate fourth layer initial object class features and fourth layer initial object boundary features. The fourth layer feature map processing 361 may be configured to perform its processing based on the format of the one or more fourth layer feature maps. For example, if the one or more fourth layer feature maps includes an object class feature map and an object boundary feature map, the fourth layer feature map processing 361 may be configured to separate the two feature maps from each other; forward the object class feature map as the fourth layer initial object class feature map; and forward the object boundary feature map as the fourth layer initial object boundary feature map. As another example, if the one or more fourth layer feature maps includes a concatenation of object class features and object boundary features, the fourth layer feature map processing 361 may be configured to extract the object class features and the object boundary features; forward the object class feature map as the fourth layer initial object class feature map; and forward the object boundary feature map as the fourth layer initial object boundary feature map.

The fourth layer initial object class features and the fourth layer initial object boundary features are shown in FIG. 3D as being processed along their own pathway. In this way, the fourth layer initial object class features may, based on the fourth layer being the lowest layer in the hierarchy, be processed by fourth layer fusion processing 369. The fourth layer initial object boundary features may be processed by fourth layer object class processing 364.

The fourth layer object boundary processing 364 may be configured to receive the fourth layer initial object boundary features and, as shown via 347, the object boundary features from the third layer. The fourth layer object boundary processing 364 may be configured to process the fourth layer initial object boundary features based on the object boundary features from the third layer. Details of this process is provided in FIG. 4B. In general, the fourth layer initial object boundary processing 364 may be configured to determine weights based on the object boundary features from the third layer, and determine object boundary features based on the weights and the fourth layer initial object boundary features. The fourth layer object boundary features may be provided to the fourth layer fusion processing 369.

The fourth layer fusion processing 369 may be configured to receive the fourth layer initial object class features; receive the fourth layer object boundary features; and determine fourth layer fused object class and boundary features. Details of this process is provided in FIG. 4C. In general, the fourth layer fusion processing 369 may be configured to determine weights based on the fourth layer object boundary features, and determine the fourth layer fused object class and object boundary features based on the weights and the fourth layer initial object class features. The fourth layer fused object class and object boundary features may be provided to the fourth layer output processing 371.

The fourth layer output processing 371 may be configured to receive the fourth layer fused object class and object boundary features; receive the fourth layer initial object class features; and determine the fourth layer segmentation data. The fourth layer segmentation data may be determined, for example, by summing the fourth layer fused object class and object boundary features and the fourth layer initial object class features. The fourth layer segmentation data may be provided as output from the fourth layer's cross-layer pathway 225 and to the third layer combiner 257 (not shown).

The fourth layer's cross-layer pathway 225 may also be configured to provide object class features to a higher layer. Thus, as shown via 376, the fourth layer's cross-layer pathway 225 is shown as being configured to provide the fourth layer object class features to the third layer.

Figure 4A:
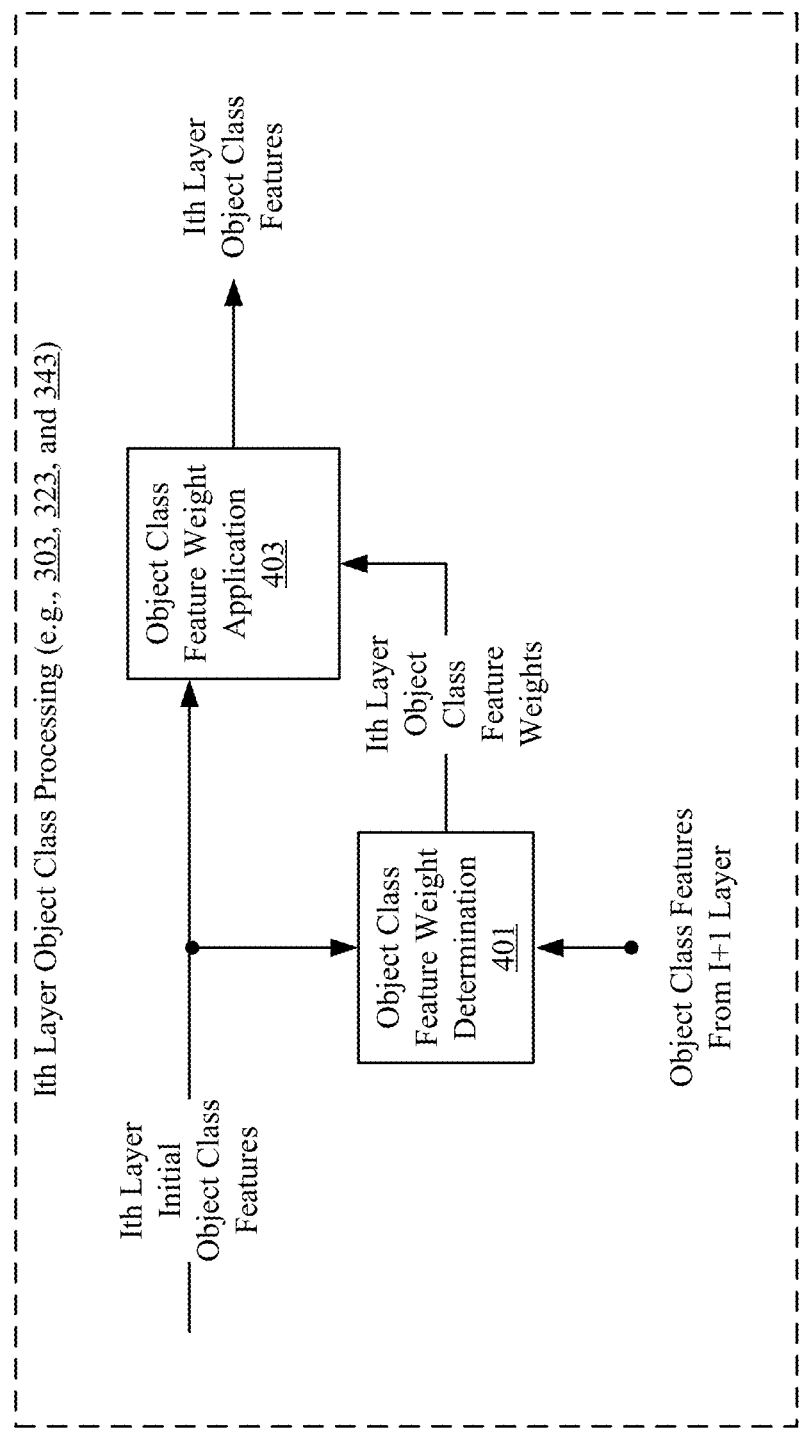
FIGS. 4A-4C provide example block diagrams for performing additional cross-layer object class and object boundary processing.
Figure 4B:
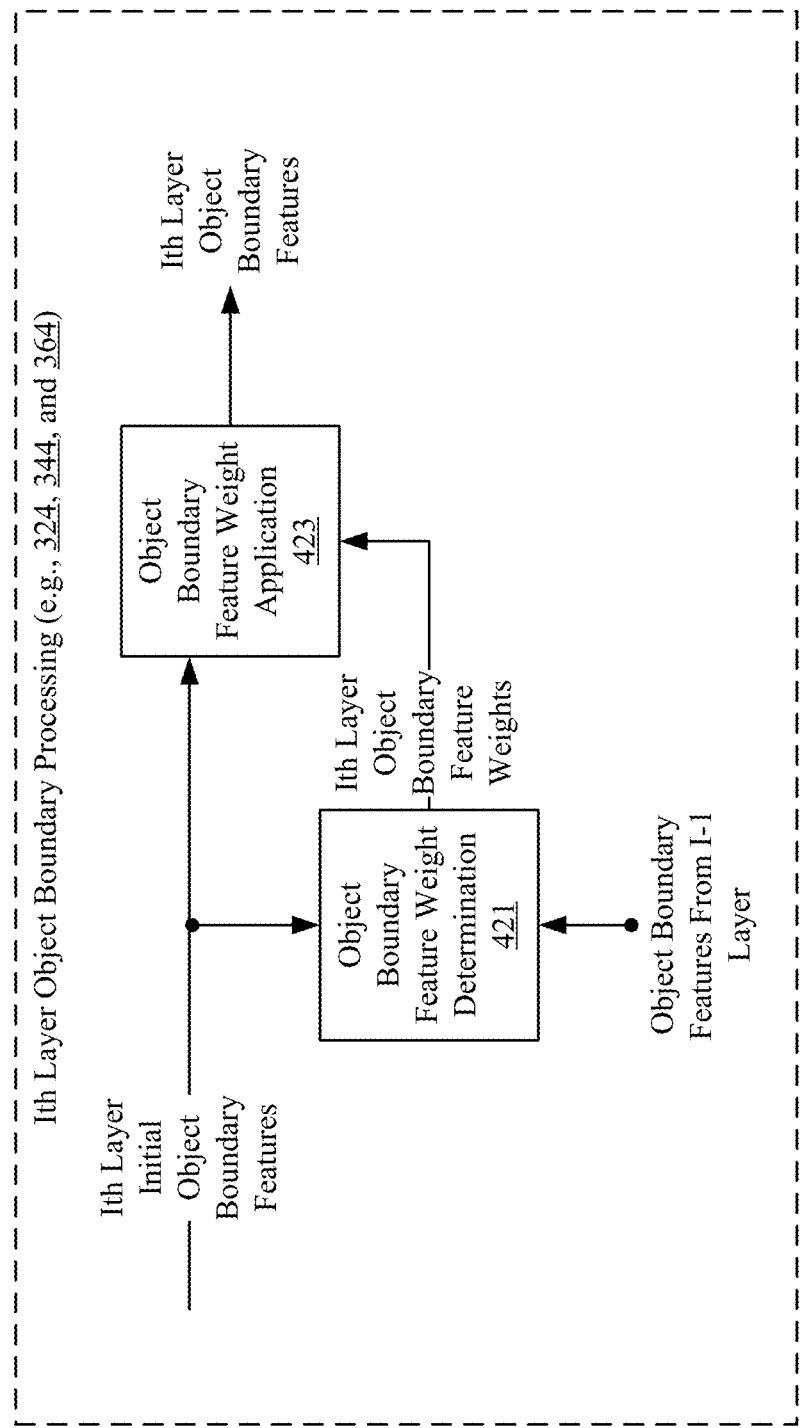
Figure 4C:
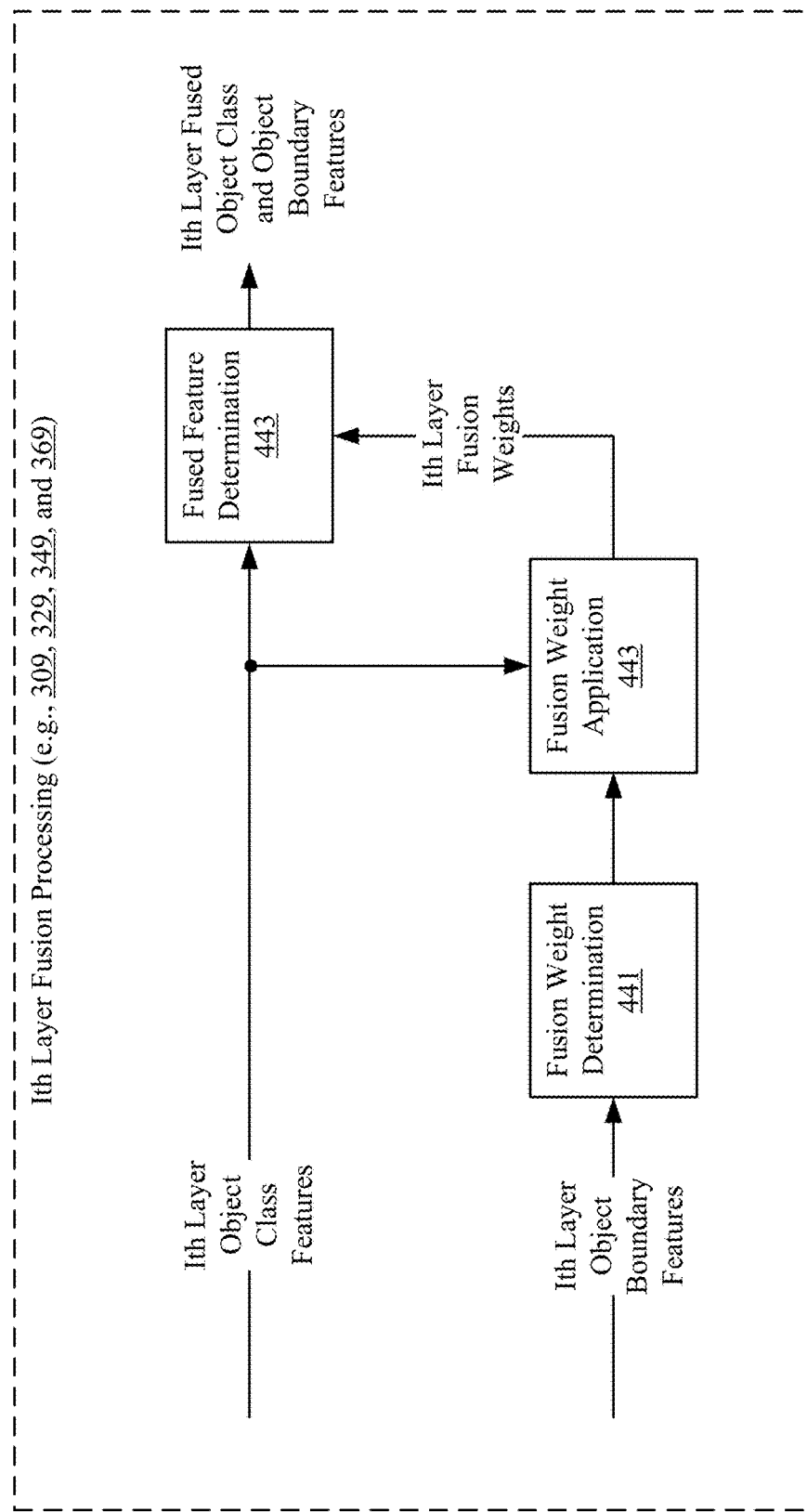

FIGS. 4A-4C show example block diagrams for performing cross-layer object class and object boundary processing. Further, FIGS. 4A-4C show additional details of certain blocks of the cross-layer pathways 210, 215, 220, and 225, which are depicted in FIGS. 3A-3D. For example, FIG. 4A shows additional details of object class processing (e.g., blocks 303, 323, and 343). FIG. 4B shows additional details of object boundary processing (e.g., blocks 324, 344, and 364). FIG. 4C shows additional details of fusion processing (e.g., blocks 309, 329, 349, and 369).

Beginning with FIG. 4A, additional details of object class processing for blocks 303, 323, and 343 of FIGS. 3A-3C are shown. As each of FIGS. 3A-3C illustrates a cross-layer pathway for a different layer of the hierarchy, FIG. 4A is shown as being directed to a generic Ith layer. As shown in FIG. 4A, the Ith layer object class processing is shown as being configured to receive, as input, Ith layer initial object class features (e.g., first layer initial object class features for block 303; second layer initial object class features for block 323; and third layer initial object class features for block 343). The Ith layer object class processing is also shown as being configured to receive, as input, object class features from an I+1 layer in the hierarchy (e.g., object class features from the second layer for block 303; object class features from the third layer for block 323; and object class features from the fourth layer for block 343). The Ith layer object class processing is shown as being configured to generate, as output, Ith layer object class features (e.g., first layer object class features for block 303; second layer object class features for block 323; and third layer object class features for block 343). The Ith layer object class processing is also shown as being configured to include object class feature weight determination 401 and object class feature weight application 403.

The object class feature weight determination 401 may be configured to determine Ith layer object class feature weights based on the Ith layer initial object class features and the object class features from the I+1 layer. For example, the Ith layer object class feature weights may be determined by performing a bilinear upscaling, or interpolation, of the object class features from the I+1 layer so that the object class features from the I and I+1 layers are of the same resolution; summing the Ith layer initial object class features and the object class features from the I+1 layer, which results in summed features; and applying a sigmoid function to the summed features. After upscaling, summing and performing the sigmoid function, each element of the Ith layer object class features may have a corresponding weight within the Ith layer object class feature weights. The Ith layer object class feature weights may be provided to the object class feature weight application 403.

The Ith layer object class feature weight application 403 may be configured to determine the Ith layer object class features based on the Ith layer initial object class features and the Ith layer object class feature weights. For example, the Ith layer object class features may be determined by multiplying the Ith layer initial object class features by the Ith layer object class feature weights. The multiplying may include multiplying each element of the Ith layer initial object class features by its corresponding weight in the Ith layer object class feature weights. The Ith layer object class features may be provided to the Ith layer fusion processing (e.g., 309, 329, and 349 of FIGS. 3A-3C).

Continuing at FIG. 4B, additional details of object boundary processing for blocks 324, 344, and 364 of FIGS. 3B-3D are shown. As each of FIGS. 3B-3D illustrates a cross-layer pathway for a different layer of the hierarchy, FIG. 4B is shown as being directed to a generic Ith layer. As shown in FIG. 4B, the Ith layer object boundary processing is shown as being configured to receive, as input, Ith layer initial object boundary features (e.g., second layer initial object boundary features for block 324; third layer initial object boundary features for block 344; and fourth layer initial object boundary features for block 364). The Ith layer object boundary processing is also shown as being configured to receive, as input, object boundary features from an I−1 layer in the hierarchy (e.g., object boundary features from the first layer for block 324; object boundary features from the second layer for block 344; and object boundary features from the third layer for block 364). The Ith layer object boundary processing is shown as being configured to generate, as output, Ith layer object boundary features (e.g., second layer object class features for block 324; third layer object boundary features for block 344; and fourth layer object boundary features for block 364). The Ith layer object boundary processing is also shown as being configured to include object boundary feature weight determination 421 and object boundary feature weight application 423.

The object boundary feature weight determination 421 may be configured to determine Ith layer object boundary feature weights based on the Ith layer initial object boundary features and the object boundary features from the I−1 layer. For example, the Ith layer object boundary feature weights may be determined by performing a bilinear downscaling, or pooling operation, of the object boundary features from the I−1 layer so that the object boundary features from the I and I−1 layers are of the same resolution; summing the Ith layer initial object boundary features and the object boundary features from the I−1 layer, which results in summed features; and applying a sigmoid function to the summed features. After downscaling, summing and performing the sigmoid function, each element of the Ith layer object boundary features may have a corresponding weight within the Ith layer object boundary feature weights. The Ith layer object boundary feature weights may be provided to the object boundary feature weight application 423.

The Ith layer object boundary feature weight application 423 may be configured to determine the Ith layer object boundary features based on the Ith layer initial object boundary features and the Ith layer object boundary feature weights. For example, the Ith layer object boundary features may be determined by multiplying the Ith layer initial object boundary features by the Ith layer object boundary feature weights. The multiplying may include multiplying each element of the Ith layer initial object boundary features by its corresponding weight in the Ith layer object boundary feature weights. The Ith layer object boundary features may be provided to the Ith layer fusion processing (e.g., 329, 349, and 369 of FIGS. 3B-3D).

Continuing at FIG. 4C, additional details of object fusion processing for blocks 309, 329, 349, and 369 of FIGS. 3A-3D are shown. As each of FIGS. 3A-3D illustrates a cross-layer pathway for a different layer of the hierarchy, FIG. 4C is shown as being directed to a generic Ith layer. As shown in FIG. 4C, the Ith layer object fusion processing is shown as being configured to receive, as input, Ith layer object class features (e.g., first layer object class features for block 309; second layer object class features for block 329; third layer object class features for block 349; and fourth layer initial object class features for block 369). The Ith layer object fusion processing is also shown as being configured to receive, as input, Ith layer object boundary features (e.g., first layer initial object boundary features for block 309; second layer object boundary features for block 329; third layer object boundary features for block 349; and fourth layer object boundary features for block 369). The Ith layer object fusion processing is shown as being configured to generate, as output, Ith layer fused object class and object boundary features (e.g., first layer fused object class and object boundary features for block 309; second layer fused object class and object boundary features for block 329; third layer fused object class and object boundary features for block 349; and fourth layer fused object class and object boundary features for block 369). The Ith layer object fusion processing is also shown as being configured to include fusion weight determination 441, fusion weight application 443, and fused feature determination 443.

The fusion weight determination 441 and the fusion weight application 443 may be configured to perform one or more operations that result in the determination of the Ith layer fusion weights. For example, the fusion weight determination 441 may apply a sigmoid function to the Ith layer object boundary features, resulting in sigmoid-based boundary features. The sigmoid-based boundary features may be provided, as input, to the fusion weight application 443. The fusion weight application 443 may be configured to multiply the Ith layer object class features by the sigmoid-based boundary features, which results in the Ith layer fusion weights. After performing the sigmoid function and the multiplying, each element of the Ith layer object class features may have a corresponding weight within the Ith layer fusion weights. The Ith layer object boundary feature weights may be provided to the fused feature determination 443.

The fused feature determination may be configured to determine the Ith layer fused object class and object boundary features based on the Ith layer object class features and the Ith layer fusion weights. For example, the Ith layer fused object class and object boundary features may be determined by summing the Ith layer object class features by the Ith layer fusion weights. The summing may include summing each element of the Ith layer object class features by its corresponding weight in the Ith layer fusion weights. The Ith layer fused object class and object boundary features may be provided to the Ith layer output processing (e.g., 311, 331, 351, and 371 of FIGS. 3A-3D).

Based on the above description of FIGS. 2, 3A-3D, and 4A-4C, the various cross-layer pathways 210, 215, 220, and 225 are configured to determine object class features and object boundary features based on features shared from lower and higher layers in the hierarchy. As compared to the initial object class features and initial object class boundary features, the sharing may cause object classifications and/or object boundaries to change based on the processes performed by the cross-layer pathways 210, 215, 220, and 225. To illustrate examples of these changes, FIGS. 5A-5B show examples of object class features and object boundary features that may be generated by cross-layer pathways 210, 215, 220, and 225.

Beginning with FIG. 5A, examples of object class features are shown for object class processing 303, 323 and 343 of FIGS. 3A-3C. For each object class processing 303, 323, and 343, an example of initial object class features is shown as input for the object class processing and an example of object class features is shown as output for the object class processing. For example, an example of first layer initial object class features is shown as input for object class processing 303, and an example of first layer object class features is shown as output for object class processing 303. An example of second layer initial object class features is shown as input for object class processing 323, and an example of second layer object class features is shown as output for object class processing 323. An example of third layer initial object class features is shown as input for object class processing 343, and an example of third layer object class features is shown as output for object class processing 343. For each example, the text "Layer-1", "Layer-2", and "Layer-3" is superimposed on the example for clarity of the example.

Additionally, for each example of the initial object class features, elliptical shapes are superimposed on each example to illustrate areas where the initial object class features differ from the object class features that are output from the object class processing. For example, for the first layer object class processing 303, the first layer initial object class features are superimposed with three elliptical shapes to indicate areas with misclassified objects. These classification errors are diminished or not present in the first layer object class features. By determining the first layer object class features based on the first layer initial object class features and the object class features from the second layer, the object classification of the first layer can be improved. As another example, for the second layer object class processing 323, the second layer initial object class features are superimposed with eight elliptical shapes to indicate areas with misclassified objects. These classification errors are diminished or not present in the second layer object class features. By determining the second layer object class features based on the second layer initial object class features and the object class features from the third layer, the object classification of the second layer can be improved. As another example, for the third layer object class processing 343, the third layer initial object class features are superimposed with four elliptical shapes to indicate areas with misclassified objects. These classification errors are diminished or not present in the third layer object class features. By determining the third layer object class features based on the third layer initial object class features and the object class features from the fourth layer, the object classification of the third layer can be improved.

Continuing with FIG. 5B, examples of object boundary features are shown for object boundary processing 324, 344 and 364 of FIGS. 3B-3D. For each object boundary processing 324, 344, and 364, an example of initial object boundary features is shown as input for the object boundary processing and an example of object boundary features is shown as output for the object boundary processing. For example, an example of second layer initial object boundary features is shown as input for object boundary processing 324, and an example of second layer object boundary features is shown as output for object boundary processing 324. An example of third layer initial object class features is shown as input for object boundary processing 344, and an example of third layer object boundary features is shown as output for object boundary processing 344. An example of fourth layer initial object boundary features is shown as input for object boundary processing 364, and an example of fourth layer object boundary features is shown as output for object boundary processing 364. For each example, the text "Layer-2", "Layer-3", and "Layer-4" is superimposed on the example for clarity.

Additionally, by comparing the boundary information present in the initial object boundary features to the boundary information present in the object boundary features that is output from the object boundary processing, improvements in object boundary definition are illustrated by the examples of FIG. 5B. For example, for the second layer object boundary processing 324, a comparison between the second layer initial object boundary features and the second layer object boundary features indicates that the second layer object boundary features have greater boundary information than the second layer initial object boundary features. By determining the second layer object boundary features based on the second layer initial object boundary features and the object boundary features from the first layer, the object boundary definition of the second layer can be improved. As another example, for the third layer object boundary processing 344, a comparison between the third layer initial object boundary features and the third layer object boundary features indicates that the third layer object boundary features have greater boundary information than the third layer initial object boundary features. By determining the third layer object boundary features based on the third layer initial object boundary features and the object boundary features from the second layer, the object boundary definition of the third layer can be improved. As another example, for the fourth layer object boundary processing 364, a comparison between the fourth layer initial object boundary features and the fourth layer object boundary features indicates that the fourth layer object boundary features have greater boundary information than the fourth layer initial object boundary features. By determining the fourth layer object boundary features based on the fourth layer initial object boundary features and the object boundary features from the third layer, the object boundary definition of the fourth layer can be improved.

FIGS. 6A and 6B provide example methods for performing semantic segmentation based on a hierarchy similar to the arrangement(s) depicted in FIGS. 2, FIGS. 3A-3D and 4A-4C. Further, FIG. 6A provides an example method for performing semantic segmentation based on a hierarchy having two or more layers (e.g., the example hierarchy of FIG. 2 and as further discussed in FIGS. 3A-3D and 4A-4C). FIG. 6B provides an example method for performing aspects of a single layer of the hierarchy (e.g., a single layer of FIG. 2 and as further discussed in one or more of FIGS. 3A-3D and 4A-4C). One or more computing devices may be configured to perform one or both of the example methods of FIGS. 6A and 6B.

Beginning with FIG. 6A, the example method of FIG. 6A may be performed by one or more computing devices configured to perform semantic segmentation based on two or more layers of a hierarchy of neural networks. Further, the one or more computing devices may be configured to perform semantic segmentation based on the hierarchy depicted in FIG. 2 and further discussed in FIGS. 3A-3D and 4A-4C.

At step 601, the one or more computing devices may receive input image data.

The input image data may be the same or similar to the input image data 201 of FIG. 2. Further, the input image data may be data from a single image and/or from a video. Further, the input image data may have been pre-processed to transform the image data into a format that an encoder associated with the highest layer of a hierarchy of neural networks can receive as input.

At step 603, the one or more computing devices may process, based on a hierarchy of neural networks, the input image data. For example, this processing may be performed the same as or similar the manner in which the encoders 203, 205, 207 and 209 of FIG. 2 process the input image data 201. Additionally, each neural network may be or include a CNN, or some other type of deep learning neural network, that is configured to perform one or more operations on the neural network's input. The neural networks may be arranged to analyze input data at successively reduced resolutions.

At step 605, the one or more computing devices may receive, for each layer of the hierarchy, one or more feature maps. For example, based on the processing performed by the neural networks, one or more feature maps may be generated for each layer of the hierarchy (e.g., the one or more first layer feature maps, the one or more second layer feature maps, the one or more third layer feature maps, and the one or more fourth layer feature maps of FIG. 2). The one or more feature maps may be of a resolution that is based on the associated layer's relative position in the hierarchy. For example, the set of feature maps for a first layer of the hierarchy may be of a greater resolution than the second layer of the hierarchy. Further, for each layer of the hierarchy, the one or more feature maps may include an object class feature map and an object boundary feature map.

At step 607, the one or more computing devices may determine, for each layer of the hierarchy, initial object class features and initial object boundary features. This determination may be performed based on a cross-layer pathway (e.g., cross-layer pathway 210, 215, 220, and 225 of FIG. 2). For example, the initial object class features and the initial object boundary features may be determined the same as or similar to the process by which the feature map processing of a cross-layer pathway determines the initial object class features and the initial object boundary features (e.g., first layer feature map processing 301 of FIG. 3A, second layer feature map processing 321 of FIG. 3B, third layer feature map processing 341 of FIG. 3C, and fourth layer feature map processing 361 of FIG. 3D).

At step 609, the one or more computing devices may determine, for each layer of the hierarchy that is associated with a lower layer of the hierarchy, object class features. In other words, object class features may be determined for each layer except the lowest layer of the hierarchy. With respect to the example hierarchy of FIG. 2, object class features may be determined for the first layer, the second layer and the third layer, but not the fourth layer. This determination may be performed based on a cross-layer pathway (e.g., cross-layer pathway 210, 215, 220, and 225 of FIG. 2). For example, the object class features may be determined the same as or similar to the process by which the object class processing of a cross-layer pathway determines the object class features (e.g., first layer object class processing 303 of FIG. 3A and FIG. 4A; second layer object class processing 323 of FIG. 3B and FIG. 4A; third layer object class processing 343 of FIG. 3C and FIG. 4A). Accordingly, for a layer of the hierarchy that is associated with a lower layer of the hierarchy, the object class features may be determined based on the layer's initial object class features and the lower layer's object class features.

At step 611, the one or more computing devices may determine, for each layer of the hierarchy that is associated with a higher layer of the hierarchy, object boundary features. In other words, object boundary features may be determined for each layer except the highest layer of the hierarchy. With respect to the example hierarchy of FIG. 2, object class features may be determined for the second layer, the third layer and the fourth layer, but not the first layer. This determination may be performed based on a cross-layer pathway (e.g., cross-layer pathway 210, 215, 220, and 225 of FIG. 2). For example, the object boundary features may be determined the same as or similar to the process by which the object boundary processing of a cross-layer pathway determines the object boundary features (e.g., second layer object boundary processing 324 of FIG. 3B and FIG. 4B; third layer object boundary processing 344 of FIG. 3C and FIG. 4B; fourth layer object boundary processing 364 of FIG. 3D and FIG. 4B). Accordingly, for a layer of the hierarchy that is associated with a higher layer of the hierarchy, the object boundary features may be determined based on the layer's initial object boundary features and the higher layer's object boundary features.

At step 613, the one or more computing devices may determine, for each layer of the hierarchy, fused object class and object boundary features. This determination may be performed based on a cross-layer pathway (e.g., cross-layer pathway 210, 215, 220, and 225 of FIG. 2). For example, the fused object class and object boundary features may be determined the same as or similar to the process by which the fusion processing of a cross-layer pathway determines the fused object class and object boundary features (e.g., first layer fusion processing 309 of FIG. 3A and FIG. 4C; second layer fusion processing 329 of FIG. 3B and FIG. 4C; third layer fusion processing 349 of FIG. 3C and FIG. 4C; fourth layer fusion processing 369 of FIG. 3D and FIG. 4D). Accordingly, for a layer of the hierarchy, the fused object class and object boundary features may be determined based on the layer's object boundary features and the layer's object class features.

At step 615, the one or more computing devices may determine, for each layer of the hierarchy, segmentation data. This determination may be performed based on a cross-layer pathway (e.g., cross-layer pathway 210, 215, 220, and 225 of FIG. 2). For example, the segmentation data may be determined the same as or similar to the process by which the output processing of a cross-layer pathway determines the segmentation data (e.g., first layer output processing 311 of FIG. 3A; second layer output processing 331 of FIG. 3B; third layer output processing 351 of FIG. 3C; and fourth layer output processing 371 of FIG. 3D). Accordingly, for a layer of the hierarchy, the segmentation data may be determined based on the layer's fused object class and object boundary features and the layer's initial object class features.

At step 617, the one or more computing devices may determine, based on the segmentation data of each layer of the hierarchy, hierarchy-based segmentation data. This determination may be performed the same as or similar to the process by which the combiners of FIG. 2 cause determination of the hierarchy-based segmentation data (e.g., first layer combiner 253, second layer combiner 255, and third layer combiner 257 of FIG. 2). For example, the hierarchy-based segmentation data may be determined based on upscaling and/or concatenating segmentation data for the two or more layers of the hierarchy. Accordingly, and with respect to a four layer hierarchy, the hierarchy-based segmentation data may be determined based on one or more upscaling of and/or concatenations of the first layer segmentation data, the second layer segmentation data, the third layer segmentation data, and the fourth layer segmentation data. The hierarchy-based segmentation data may be the same as or similar to the hierarchy-based segmentation data 275 of FIG. 2.

At step 619, the one or more computing devices may send and/or store the hierarchy-based segmentation data. The sending or storing may enable access to the hierarchy-based segmentation data by another process, computing device, software application, or the like, that is performing a computer vision application or service. For example, the hierarchy-based segmentation data may be accessed and/or used by an application of a computing device that is performing a semantic segmentation of image data captured via a camera. The mobile device, for example, may cause display of the hierarchy-based segmentation data. The hierarchy-based segmentation data may be accessed and/or used by a computing device that is performing a smart home service (e.g., a home security system having one or more cameras monitoring entry ways of the home or premises). The computing device, as part of the smart home service, may analyze the hierarchy-based segmentation data to determine whether to activate another smart home device or a function of the smart home service (e.g., activate a microphone to enable voice commands or raise an alarm). The hierarchy-based segmentation data may be accessed and/or used by a computing device that is performing a video conferencing service. The computing device, as part of the video conferencing service may analyze the hierarchy-based segmentation data to determine whether to activate a function of the video conferencing service. The hierarchy-based segmentation data may be accessed and/or used by a computing device providing an Internet-of-Things (IoT) service. The computing device, as part of the IoT service, may analyze the hierarchy-based segmentation data to determine whether to activate a function of an IoT device (e.g., activate a touch screen). The hierarchy-based segmentation data may be accessed and/or used by a computing device that is performing an autonomous driving service. The computing device, as part of the autonomous driving service, may analyze the hierarchy-based segmentation data to determine whether to activate a function of the autonomous driving service (e.g., activate automated braking of the autonomous driving service; activate a proximity warning).

Continuing with FIG. 6B, the example method of FIG. 6B may be performed by one or more computing devices configured to perform aspects of a single layer of a hierarchy of neural networks. Further, the one or more computing devices may be configured to perform the aspects of a single layer of the hierarchy depicted in FIG. 2 and further discussed in FIGS. 3A-3D and 4A-4C. Depending on the relative position of the layer in the hierarchy, some steps of the example method of FIG. 6B may not be performed. For example, if the layer is lowest in the hierarchy (e.g., the fourth layer of FIG. 2), steps 657, 659, 667, and 673 may not be performed, the initial object class features may be used as the object class features at step 669, and the layer's segmentation data may be used as the layer-based segmentation data at step 675. As another example, if the layer is highest in the hierarchy (e.g., the first layer of FIG. 2), steps 661, 663, 665, and 675 may not be performed, the initial object boundary features may be used as the object class features at step 669, and the layer-based segmentation data may instead be output as hierarchy-based segmentation data.

At step 651, the one or more computing devices may receive, for a layer of a hierarchy and from an encoder associated with the layer, one or more feature maps. The one or more feature maps may be the same as or similar to the feature maps described in connection with FIG. 2 (e.g., the one or more first layer feature maps as output by encoder 203; the one or more second layer feature maps as output by encoder 205; the one or more third layer feature maps as output by encoder 207; and the one or more fourth layer feature maps as output by encoder 209). The one or more feature maps may have been generated by a neural network of the encoder associated with the layer. For example, if the encoder associated with the layer includes a CNN, the one or more feature maps may have been generated based on one or more convolution and/or pooling operations performed by the CNN. The one or more feature maps may include an object class feature map and an object boundary feature map.

At step 653, the one or more computing devices may determine, for the layer and based on the one or more feature maps, initial object class features. This determination may be performed based on a cross-layer pathway (e.g., one of cross-layer pathways 210, 215, 220, and 225 of FIG. 2). For example, the initial object class features may be determined the same as or similar to the process by which the feature map processing of a cross-layer pathway determines the initial object class features (e.g., first layer feature map processing 301 of FIG. 3A, second layer feature map processing 321 of FIG. 3B, third layer feature map processing 341 of FIG. 3C, and fourth layer feature map processing 361 of FIG. 3D).

At step 655, the one or more computing devices may determine, for the layer and based on the one or more feature maps, initial object boundary features. This determination may be performed based on a cross-layer pathway (e.g., one of cross-layer pathways 210, 215, 220, and 225 of FIG. 2). For example, the initial object boundary features may be determined the same as or similar to the process by which the feature map processing of a cross-layer pathway determines the initial object boundary features (e.g., first layer feature map processing 301 of FIG. 3A, second layer feature map processing 321 of FIG. 3B, third layer feature map processing 341 of FIG. 3C, and fourth layer feature map processing 361 of FIG. 3D).

At step 657, the one or more computing devices may receive, for the layer, object class features from a lower layer of the hierarchy. The lower layer's object class features may be received based on a cross-layer pathway (e.g., cross-layer pathways 210, 215, 220, and 225 of FIG. 2). For example, the lower layer's object class features may be received from a lower layer of the hierarchy based on the cross-layer pathway of the layer and the cross-layer pathway both being configured to share the lower layer's object class features (e.g., items 326, 346, and 376 of FIGS. 3A-3D).

At step 659, the one or more computing devices may determine, for the layer, based on the initial object class features and the object class features from the lower layer of the hierarchy, object class features. The layer's object class features may be determined based on a cross-layer pathway (e.g., cross-layer pathways 215, 220, and 225 of FIG. 2). For example, the layer's object class features may be determined the same or similar to the process by which the object class processing of a cross-layer pathway determines the object class features (e.g., first layer object class processing 303 of FIG. 3A and FIG. 4A; second layer object class processing 323 of FIG. 3B and FIG. 4A; third layer object class processing 343 of FIG. 3C and FIG. 4A). Accordingly, the layer's object class features may be determined based on the layer's initial object class features and object class feature weights. The object class feature weights may be based on the object class features from the lower layer of the hierarchy and the layer's initial object class features.

At step 661, the one or more computing devices may send, for the layer and to a higher layer of the hierarchy, the object class features. The layer's object class features may be sent based on a cross-layer pathway (e.g., cross-layer pathways 210, 215, 220, and 225 of FIG. 2). For example, the layer's object class features may be sent to a higher layer of the hierarchy based on the cross-layer pathway of the layer and the cross-layer pathway of the higher layer both being configured to share the layer's object class features (e.g., items 326, 346, and 376 of FIGS. 3A-3D).

At step 663, the one or more computing devices may receive, for the layer, object boundary features from the higher layer of the hierarchy. The higher layer's object boundary features may be received based on a cross-layer pathway (e.g., cross-layer pathways 210, 215, 220, and 225 of FIG. 2). For example, the higher layer's object boundary features may be received based on the cross-layer pathway of the layer and the cross-layer pathway of the higher layer both being configured to share the higher layer's object class features (e.g., items 307, 327, and 347 of FIGS. 3A-3D).

At step 665, the one or more computing devices may determine, for the layer, based on the initial object boundary features and the object boundary features from the higher layer of the hierarchy, object boundary features. The layer's object boundary features may be determined based on a cross-layer pathway (e.g., cross-layer pathways 210, 215, and 220 of FIG. 2). For example, the layer's object boundary features may be determined the same or similar to the process by which the object boundary processing of a cross-layer pathway determines the object boundary features (e.g., second layer object boundary processing 324 of FIG. 3B and FIG. 4B; third layer object boundary processing 344 of FIG. 3C and FIG. 4B; and fourth layer object boundary processing 364 of FIG. 3D and FIG. 4B). Accordingly, the layer's object boundary features may be determined based on the layer's initial object boundary features and object boundary feature weights. The object boundary feature weights may be based on the object boundary features from the higher layer of the hierarchy and the layer's initial object boundary features.

At step 667, the one or more computing devices may send, for the layer and to the lower layer of the hierarchy, the object boundary features. The layer's object boundary features may be sent based on a cross-layer pathway (e.g., cross-layer pathways 210, 215, 220, and 225 of FIG. 2). For example, the layer's object boundary features may be sent to a lower layer of the hierarchy based on the cross-layer pathway of the layer and the cross-layer pathway of the lower layer both being configured to share the layer's object boundary features (e.g., items 307, 327, and 347 of FIGS. 3A-3D).

At step 669, the one or more computing devices may determine, for the layer, based on the object class features and the object boundary features, fused object class and object boundary features. The layer's fused object class and object boundary features may be determined based on a cross-layer pathway (e.g., cross-layer pathways 210, 215, 220, and 225 of FIG. 2). For example, the layer's fused object class and object boundary features may be determined the same or similar to the process by which the fusion processing of a cross-layer pathway determines the fused object class and object boundary features (e.g., first layer fusion processing 309 of FIG. 3A and FIG. 4C; second layer fusion processing 329 of FIG. 3B and FIG. 4C; third layer fusion processing 349 of FIG. 3C and FIG. 4C; and fourth layer fusion processing 369 of FIG. 3D and FIG. 4C). Accordingly, the layer's fused object class and object boundary features may be determined based on the layer's initial object class features and fusion weights. The fusion weights may be based on the layer's object boundary features and the layer's object class features.

At step 671, the one or more computing devices may determine, for the layer, based on the layer's initial object class features and the fused object class and object boundary features, segmentation data. This determination may be performed based on a cross-layer pathway (e.g., cross-layer pathway 210, 215, 220, and 225 of FIG. 2). For example, the layer's segmentation data may be determined the same as or similar to the process by which the output processing of a cross-layer pathway determines the segmentation data (e.g., first layer output processing 311 of FIG. 3A; second layer output processing 331 of FIG. 3B; third layer output processing 351 of FIG. 3C; and fourth layer output processing 371 of FIG. 3D).

At step 673, the one or more computing devices may determine, for the layer, based on the layer's segmentation data, and based on segmentation data associated with one or more lower layers of the hierarchy, layer-based segmentation data. This determination may be performed the same as or similar to the process by which the combiners of FIG. 2 combine segmentation data of at least two layers together (e.g., first layer combiner 253, second layer combiner 255, and third layer combiner 257 of FIG. 2). For example, if the layer is the second layer of FIG. 2, this determination would be performed similar to or the same as the second layer combiner 255. As a more general example, the layer-based segmentation data may be determined based on concatenating the layer's segmentation data and the segmentation data associated with the one or more lower layers of the hierarchy, and upscaling the resulting concatenated data.

At step 675, the one or more computing devices may send, for the layer and to the higher layer of the hierarchy, the layer-based segmentation data. The layer-based segmentation data may be sent in order for additional processing to be performed by the higher layer (e.g., step 673 for the higher layer). Based on the layer-based segmentation data being sent to a higher layer and additional processing being performed by the higher layer, hierarchy-based segmentation data can be determined based on the layer-based segmentation data and additional layer-based segmentation data associated with at least one other layer of the hierarchy.

FIG. 7 shows an example apparatus that may be used to implement all or a portion of a hierarchy discussed throughout this disclosure including those discussed in connection with FIGS. 2, 3A-3D, 4A-4C, 5A-5B, and 6A-6B. Moreover, any of the method steps, operations, procedures or functions described herein may be implemented using one or more processors and/or one or more memory in combination with machine executable instructions that cause the processors and other components to perform various method steps, described features, or other aspect described herein.

[99] FIG. 7 shows a computing device 712. The computing device 712 may be configured to perform some or all of the functions or aspects of a hierarchy discussed throughout this disclosure including those discussed in connection with FIGS. 2, 3A-3D, 4A-4C, and 5A-5B. Further, the computing device 712 may be configured to perform some or all of the steps discussed in connection with FIGS. 6A and 6B. The computing device 712 may be configured to perform any other process, feature or aspect discussed in connection with the other Figures of this disclosure, or any variation thereof. Additionally, although FIG. 7 generally relates to a mobile device, other devices or systems may include the same or similar components and perform the same or similar functions and methods.

The computing device 712 shows just one example of the various types of hardware components that may be present in an apparatus that is configured to implement one or more aspects described in this disclosure. Computing device 712 may include a controller 725. The controller 725 may be connected to a user interface control 730, display 736 and/or other elements as illustrated. Controller 725 may include circuitry, such as for example one or more processors 728 and one or more memory 734 storing software 740. The software 740 may comprise, for example, one or more of the following software options: client software 765, user interface software, server software, etc.

Device 712 may also include a battery 750 or other power supply device, speaker 753, and one or more antennae 754. Device 712 may include user interface circuitry, such as user interface control 730. User interface control 730 may include controllers or adapters, and other circuitry, configured to receive input from or provide output to a keypad, touch screen, voice interface—for example via microphone 756, function keys, joystick, data glove, mouse and the like. The user interface circuitry and user interface software may be configured to facilitate user control of at least some functions of device 712 though use of a display 736. Display 736 may be configured to display at least a portion of a user interface of device 712. Additionally, the display may be configured to facilitate user control of at least some functions of the device (for example, display 736 could be a touch screen). Device 712 may also include additional devices, such as camera 760. Camera 760 may be able to capture images or video.

Software 740 may be stored within memory 734 to provide instructions to processor 728 such that when the instructions are executed, processor 728, device 712 and/or other components of device 712 are caused to perform various processes or methods, such as those described herein. The software may comprise machine executable instructions and data used by processor 728 and other components of computing device 712 may be stored in a storage facility such as memory 734 and/or in hardware logic in an integrated circuit, ASIC, etc. Software may include both applications and operating system software, and may include code segments, instructions, applets, pre-compiled code, compiled code, computer programs, program modules, engines, program logic, and combinations thereof.

Memory 734 may include any of various types of tangible machine-readable storage medium, including one or more of the following types of storage devices: read only memory (ROM) modules, random access memory (RAM) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein (including the claims), a tangible or non-transitory machine-readable storage medium is a physical structure that may be touched by a human. A signal would not by itself constitute a tangible or non-transitory machine-readable storage medium, although other embodiments may include signals or ephemeral versions of instructions executable by one or more processors to carry out one or more of the operations described herein.

As used herein, processor 728 (and any other processor or computer described herein) may include any of various types of processors whether used alone or in combination with executable instructions stored in a memory or other computer-readable storage medium. Processors should be understood to encompass any of various types of computing structures including, but not limited to, one or more microprocessors, special-purpose computer chips, field-programmable gate arrays (FPGAs), controllers, application-specific integrated circuits (ASICs), combinations of hardware/firmware/software, or other special or general-purpose processing circuitry.

As used in this application, the term 'circuitry' may refer to any of the following: (a) hardware-only circuit implementations (such as implementations in only analog and/or digital circuitry) and (b) combinations of hardware circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) hardware circuits, such as a microprocessor(s) or a portion of a microprocessor(s), that require software or firmware for operation, even if the software or firmware is not physically present.

These examples of 'circuitry' apply to all uses of this term in this application, including in any claims. As an example, as used in this application, the term "circuitry" would also cover an implementation of merely a processor (or multiple processors) or portion of a processor and its (or their) accompanying software and/or firmware. The term "circuitry" would also cover, for example, a baseband integrated circuit or applications processor integrated circuit for a mobile phone or a similar integrated circuit in a server, a cellular network device, or other network device.

Device 712 or its various components may be mobile and be configured to receive, decode and process various types of transmissions including transmissions in Wi-Fi networks according to a wireless local area network (e.g., the IEEE 802.11 WLAN standards 802.11n, 802.11ac, etc.) and/or wireless metro area network (WMAN) standards (e.g., 802.16), through a specific one or more WLAN transceivers 743, one or more WMAN transceivers 741. Additionally or alternatively, device 712 may be configured to receive, decode and process transmissions through various other transceivers, such as FM/AM Radio transceiver 742, and telecommunications transceiver 744 (e.g., cellular network receiver such as CDMA, GSM, 4G LTE, 5G, etc.).

Based on transmissions with a network (e.g., network 770), the device 712 may communicate with one or more other computing devices 780, such as laptops, notebooks, smartphones, personal computers, servers, etc. The one or more other computing devices 780 may also be configured in a similar manner as computing device 712. Further, the one or more other computing devices 780 may be configured to perform a portion of, or aspects related to, the hierarchy discussed herein. For example, the one or more other computing devices 780 may be configured to train the neural networks for the encoders 203, 205, 207, and 209. Once the neural networks are trained, the one or more computing devices 770 may be configured to send, via the network 770, the trained neural networks to the device 712. Once received, the device 712 may be configured to configure the neural networks as part of the encoders 203, 205, 207, and 209, and allow the hierarchy to process image data based on the received neural networks. As another example, if the example apparatus 712 implements a portion of the hierarchy, the one or more computing devices 780 may implement the remaining portion of the hierarchy (e.g., devices 780). The example apparatus and the one or more other apparatuses may be able to communicate with each other via one or more wireless and/or wireless networks (e.g., network 770) while executing functions associated with their portion of the hierarchy.

FIG. 8A illustrates a block diagram of an apparatus 800 that may be embodied in/as a computing device or an apparatus which may include, but is not limited to, a camera device, a vehicle installed with the camera device, a drone installed with the camera device, an industrial robot with the camera device, etc.

As shown by the example of FIG. 8A, apparatus 800 comprises a processor 810 configured to control operations and functions of apparatus 800. For example, in some embodiments, the processor 810 may implement various operations by means of instructions 830 stored in a memory 820 coupled thereto. The memory 820 may be any suitable type adapted to local technical environment and may be implemented using any suitable data storage technology, such as semiconductor based memory devices, magnetic memory devices and systems, optical memory devices and systems, fixed memory and removable memory, as non-limiting examples. In some example embodiments the memory 820 can be a non-transitory computer readable medium. Though only one memory unit is shown in FIG. 8A, a plurality of physically different memory units may exist in apparatus 800.

The processor 810 may be any proper type adapted to local technical environment, and may include one or more of general purpose computers, special purpose computers, microprocessors, digital signal processors (DSPs), central processing units (CPUs), field-programmable gate arrays (FPGA), application specific circuits (ASIC), GPUs (Graphics Processing Unit), NPUs (Neural Network Processing Unit), AI (Artificial Intelligence) accelerators and processors based on multicore processor architecture, as non-limiting examples. The apparatus 800 may also comprise a plurality of processors 810 in any combination thereof.

The processors 810 may also be coupled with one or more radio transceiver 805 which enables reception and transmission of information over wireless communication means. In some embodiments, the radio transceiver(s) 805 may comprise wireless communication means (e.g. wireless networking means, wireless telecommunication means, means for communicating according to Long Term Evolution (LTE), the fifth generation (5G) communication, Narrow Band Internet of Things (NB-IoT), Long Range Wide Areas Network (LoRaWAN), Dedicated short-range communications (DSRC), and/or Wireless Local Area Network (WLAN), communication standards, etc.) which allows the apparatus 800 to communicate with other devices/apparatuses, for example, in vehicle-to-vehicle (V2V), vehicle-to-anything (V2X), peer-to-peer (P2P), etc. manners, and send and receive image detection related information. Additionally, the processors 810 may also be coupled to one or more wireline communication means, which enables reception and sending of information over wireline communication networks, such as local area network (LAN), Ethernet, wide area network, or any combination thereof.

In some embodiments, the processor 810 and the memory 820 may operate in cooperation to implement any method, function or aspect described with reference to FIGS. 2, 3A-3D, 4A-4C, 5A-5B, and 6A-6B. It shall be appreciated that all features described above with reference to FIGS. 2, 3A-3D, 4A-4C, 5A-5B, and 6A-6B also apply to apparatus 800, and therefore will not be detailed here.

Various embodiments of the present disclosure may be implemented by a computer program or a computer program product executable by one or more of the processors (for example processor 810 in FIG. 8A), software, firmware, hardware or in a combination thereof.

Although some embodiments are described in the context of semantic segmentation based on a hierarchy of neural networks, it should not be construed as limiting the spirit and scope of the present disclosure. The principle and concept of the present disclosure may be more generally applicable to semantic segmentation, and other position sensitive application scenarios.

In addition, the present disclosure also provides a carrier containing the computer program as mentioned above (e.g., computer instructions/grogram 830 in FIG. 8A). The carrier includes a computer readable storage medium. The computer readable storage medium may include, for example, an optical compact disk or an electronic memory device like a RAM (random access memory), a ROM (read only memory), Flash memory, magnetic tape, CD-ROM, DVD, Blue-ray disc and the like.

FIG. 8B depicts an example of a system or apparatus 850 including, such as implemented with and/or connected to, a hierarchy 870 similar what is described in connection with FIGS. 2, 3A-3D, 4A-4C, 5A-5B, and 6A-6B. In one example implementation, the system or apparatus 850 may be implemented in and/or connected to a camera device. In one example implementation, the system or apparatus 850 may be mounted in an image and/or object recognition device. In another example implementation, the system or apparatus 850 may be mounted in a vehicle 890, such as a car or truck, although the system or apparatus 850 may be used without the vehicles 890 as well. The vehicle 890 may be considered as an example of an apparatus according to an embodiment of the present disclosure, and may be configured with, for example, an ADAS (Advanced Driver-Assistance System) application and/or autonomous vehicle application.

As shown in FIG. 8B, the example system or apparatus 850 includes one or more sensors 880 (e.g., a camera, a video camera, an infrared camera, an ultrasound imaging device, a radar, a LIDAR (Light Detection And ranging) device, a Wireless LAN-Based CSI (Channel State Information) device, etc.) which can be connected to, can function with, or can be implemented with a hierarchy 870. The hierarchy 870 may be the same as or similar to the example hierarchy described in connection with FIGS. 2, 3A-3D, 4A-4C, 5A-5B, and 6A-6B. The one or more sensors 880 may configured to provide image data, such as image frames, video, pictures, and/or the like.

The system or apparatus 850 may also include one or more radio frequency transceivers 860. In some embodiments, the radio frequency transceiver 860 may include wireless communication means (e.g. wireless networking means, wireless telecommunication means, means for communicating according to LTE, 5G, NB-IoT, LoRaWAN, DSRC, and/or WLAN standards, etc.) which allows the system or apparatus 850 or the vehicle 890 to communicate with other one or more devices, apparatus or vehicles or any combination thereof for example in vehicle to vehicle (V2V), vehicle to network, vehicle to everything (V2X), peer to peer (P2P), etc. manners, and send and receive image detection related information. Further, the system or apparatus 850 or the vehicle 890 may, based on semantic segmentation performed by the hierarchy 870, perform image recognition and/or detection of objects in one or more images. Such processes that include image recognition and/or detection of objects may include the recognition and/or detection of one or more object boundary features and/or object class features. Based on the image recognition and/or detection of objects, one or more inference results, one or more commands, instructions and/or messages may be provided, sent, or transmitted to the system or apparatus 850 or the vehicle 890 itself. The one or more inference results, one or more commands, instructions and/or messages may include, for example, indications of braking, steering, accelerating, cancellation of action, location, image recognition, object classification and/or regression information, or alarm, or any combination thereof. Additionally, the system or apparatus 850 or the vehicle 890 may send or transmit the one or more inference results, one or more commands, instructions and/or messages to one or more other systems or apparatuses similar to the system or apparatus 850, the vehicle 890, or the apparatus 800, or any combination thereof.

Alternatively or in addition, in some example embodiments, the system or apparatus 850 may be trained to detect one or more objects, such as people, animals, other vehicles, traffic signs, road hazards, and/or the like based on the hierarchy 870. For instance, with the system or apparatus 850 may detect one or more objects and their relative and/or absolute locations (e.g., longitude, latitude, and altitude/elevation, and/or coordinate).

In the advanced driver assistance system (ADAS), when an object is detected, such as a vehicle/person, an output such as a warning sound, haptic feedback, indication of recognized object, or other indication may be generated for example to warn or notify a driver, for example on a display in the system or apparatus 850, the vehicle 890, or the apparatus 800. In the case of an autonomous vehicle including system or apparatus 800, such as an Autonomous Driving System (ADS) or ADAS, the detected objects may signal control circuitry to take additional action in the vehicle (e.g., initiate breaking, acceleration/deceleration, steering and/or some other action). Moreover, the indication may be transmitted to other vehicles, IoT devices or cloud, mobile edge computing (MEC) platform and/or the like via radio transceiver 860.

In some example embodiments, the system or apparatus 850 may have a training phase within the system or apparatus 890. The training phase may configure the hierarchy to learn to detect and/or classify one or more objects of interest similar to the processes described in connection with FIGS. 2, 3A-3D, 4A-4C, 5A-5B, and 6A-6B. A circuitry may be trained with images including objects such as people, other vehicles, road hazards, and/or the like. Once trained, when an image includes the object(s), the trained system or apparatus 890, based on the semantic segmentation performed by the hierarchy 870 may detect the one or more objects and their respective one or more object boundary features and/or object class features, and provide an indication of the detection/classification of the object(s). In the training phase, the hierarchy 870 may learn its configuration (e.g., parameters, weights, and/or the like). Once trained, the hierarchy 870 can be used in a test or operational phase to detect and/or classify patches or portions of an unknown, input image. Thus, the system or apparatus 890 may, based on the semantic segmentation performed by the hierarchy 870, determine whether that input image includes an object of interest or just background (i.e., not having an object of interest).

In some other example and/or related embodiments, the training phase can be executed out of the system or apparatus 850, for example in a one or more servers in a cloud system and/or in an edge system, wherein the edge and the cloud are connected over wired and/or wireless network communication means to the system or apparatus 850. In some other alternative and/or related embodiment, the training phase can be divided between the system or apparatus 850 and the cloud and/or edge system. In some other alternative or related embodiment, the training phase can be executed in the system or apparatus 850. For example, as discussed with respect to FIG. 7, a server or some other computing device (e.g., computing device 780) may perform the training, while the apparatus implements the hierarchy and processes image data based on the hierarchy.

In some other example and/or related embodiments, an inferencing or testing of the hierarchy 870 can be executed out of the system or apparatus 850, for example in a one or more servers in a cloud system and/or in an edge system, wherein the edge and the cloud are connected over wired and/or wireless network communication means to the system or apparatus 850. In some other alternative and/or related embodiment, the inferencing or testing of the hierarchy 870 can be divided between the system or apparatus 850 and the cloud and/or edge system. In some other alternative and/or related embodiment, the inferencing or testing of the hierarchy can be executed in the system or apparatus 850. In case the hierarchy 870 is trained, or partially trained out the system or apparatus that is executing the inferencing or testing, the trained neural networks of the hierarchy may be received from one or more entities which have executed the training, such as from one or more servers in a cloud system and/or in an edge system. For example, as discussed with respect to FIG. 7, a server or some other computing device (e.g., computing device 780) may perform the training, while the apparatus is configured to implement the hierarchy and process image data based on the hierarchy.

The techniques described herein may be implemented by various means so that the system or apparatus 850 implementing one or more functions of a corresponding system or apparatus described with an the one or more embodiments comprise not only prior art means, but also means for implementing the one or more functions of the corresponding system or apparatus and it may comprise separate means for each separate function, or means that may be configured to perform one or more functions. For example, these techniques may be implemented in one or more hardware (e.g., a sensor, circuitry and/or processor), firmware, software, or in any combinations thereof. For a firmware or software, implementation may be made through modules (e.g., procedures, functions, and so on) that perform the functions described herein.

Based on the above, an apparatus may comprise means for performing functions or other aspects related to semantic segmentation based on a hierarchy of neural networks. For example, an apparatus may comprise means for performing:
receiving, for a second layer of a hierarchy of neural networks, one or more feature maps;
determining, for the second layer, one or more initial object class features and one or more initial object boundary features;
determining, for the second layer, based on the one or more initial object class features and one or more third layer object class features received from a third layer of the hierarchy, one or more object class features;
determining, for the second layer, based on the one or more initial object boundary features and one or more first layer object boundary features received from a first layer of the hierarchy, one or more object boundary features;
determining, for the second layer, based on the one or more object class features and the one or more object boundary features, one or more fused object class and object boundary features;
determining, for the second layer, based on the one or more initial object class features and the one or more fused object class and object boundary features, segmentation data; and
determining, based on the segmentation data and additional segmentation data associated with the second layer or the third layer, hierarchy-based segmentation data.

FIG. 9 illustrates additional examples of segmentation data, some of which is generated by prior art techniques and some of which may be generated by a hierarchy similar to those discussed in FIGS. 2, 3A-3D, 4A-4C, 5A-5B, and 6A-6B. FIG. 9 includes examples for three different input images. The top row provides examples for input image 801; the middle row provides examples for input image 803; and the bottom row provides examples for input image 805. Each row shows the input image and example segmentation data for the input image. In particular, for each input image (801, 803, 805) and going from left to right, segmentation data generated for a prior art ground truth is provided; segmentation data generated by a prior art version of ResNet (e.g., Resnet-101-BU) is provided; segmentation data generated by a prior art version of Pyramid Scene Parsing Network (PSPNet) is provided; segmentation data generated by a prior art version of DeepLab by GOOGLE, INC (DeepLabv3+) is provided; and segmentation data generated by a hierarchy-based implementation (hierarchy-based) similar to those discussed herein is provided.

Below is a table showing experimental results of a few prior art semantic segmentation techniques and a hierarchy-based implementation (hierarchy-based) similar to those discussed herein is provided. The experimental results indicate a mean Intersection over union (mIoU) score for each semantic segmentation technique. The experimental results were gathered based on a Pascal Visual Object Classes (VOC) 2012 test set.

TABLE I

| Semantic Segmentation Technique | mIoU (%) |
|---|---|
| Fully Convolutional Network with 8× upsampled prediction (FCN-8s) [Prior Art] | 62.2 |
| DeepLab v2-conditional random fields (DeepLab v2-CRF) [Prior Art] | 71.6 |
| Deconvolution network (DeconvNet) [Prior Art] | 72.5 |
| Deep Parsing Network (DPN) [Prior Art] | 74.1 |
| Piecewise semantic segmentation [Prior Art] | 75.3 |
| PSPNet [Prior Art] | 82.6 |
| Discriminative feature network (DFN) [Prior Art] | 82.7 |
| Context encoding network (EncNet) [Prior Art] | 82.9 |
| Hierarchy-based | 83.45 |

Although specific examples of carrying out the invention have been described, there are numerous variations and permutations of the above-described systems and methods that are contained within the spirit and scope of the invention as set forth in the appended claims.

I claim:
1. A method comprising:
determining, for a second layer of a hierarchy of neural networks, one or more initial object class features and one or more initial object boundary features;
determining, for the second layer, based on the one or more initial object class features and one or more third layer object class features received from a third layer of the hierarchy, one or more second layer object class features;
determining, for the second layer, based on the one or more initial object boundary features and one or more first layer object boundary features received from a first layer of the hierarchy, one or more second layer object boundary features;

determining, for the second layer, based on the one or more second layer object class features and the one or more second layer object boundary features, one or more fused object class and object boundary features;

determining, for the second layer, based on the one or more initial object class features and the one or more fused object class and object boundary features, segmentation data; and determining, based on the segmentation data and additional segmentation data associated with the second layer or the third layer, hierarchy-based segmentation data.

2. The method of claim 1, wherein the neural networks include convolutional neural networks (CNNs).

3. The method of claim 1, wherein determining the one or more second layer object class features is performed based on one or more object class feature weights, and wherein the method further comprises:

determining, based on the one or more third layer object class features and the one or more initial object class features, the one or more object class feature weights.

4. The method of claim 1, wherein determining the one or more second layer object boundary features is performed based on one or more object boundary feature weights, and wherein the method further comprises:

determining, based on the one or more second layer object boundary features and the one or more initial object boundary features, the one or more object boundary feature weights.

5. The method of claim 1, wherein determining the one or more fused object class and object boundary features is performed based on one or more fusion weights, and wherein the method further comprises:

determining, based on the one or more second layer object class features and the one or more second layer object boundary features, the one or more fusion weights.

6. The method of claim 1, further comprising:

sending, to the third layer, the one or more second layer object class features; and sending, to the first layer, the one or more second layer object boundary features.

7. The method of claim 1, further comprising:

storing and/or sending the hierarchy-based segmentation data to enable access by one or more of a video conferencing service, a smart home service, an Internet-of-Things (IoT) service, or an autonomous driving service.

8. An apparatus comprising:
one or more processors; and
memory storing executable instructions that, when executed by the one or more processors, cause the apparatus to at least:
determine, for a second layer of a hierarchy of neural networks, one or more initial object class features and one or more initial object boundary features;
determine, for the second layer, based on the one or more initial object class features and one or more third layer object class features received from a third layer of the hierarchy, one or more second layer object class features;
determine, for the second layer, based on the one or more initial object boundary features and one or more first layer object boundary features received from a first layer of the hierarchy, one or more second layer object boundary features;
determine, for the second layer, based on the one or more second layer object class features and the one or more second layer object boundary features, one or more fused object class and object boundary features;

determine, for the second layer, based on the one or more initial object class features and the one or more fused object class and object boundary features, segmentation data; and determine, based on the segmentation data and additional segmentation data associated with the second layer or the third layer, hierarchy-based segmentation data.

9. The apparatus of claim 8, wherein the neural networks include convolutional neural networks (CNNs).

10. The apparatus of claim 8, wherein the executable instructions, when executed by the one or more processors, cause the apparatus to:

determine, based on the one or more third layer object class features and the one or more initial object class features, one or more object class feature weights; and determine the one or more second layer object class features based on the one or more object class feature weights.

11. The apparatus of claim 8, wherein the executable instructions, when executed by the one or more processors, cause the apparatus to:

determine, based on the one or more second layer object boundary features and the one or more initial object boundary features, one or more object boundary feature weights; and determine the one or more second layer object boundary features based on the one or more object boundary feature weights.

12. The apparatus of claim 8, wherein the executable instructions, when executed by the one or more processors, cause the apparatus to:

determine, based on the one or more second layer object class features and the one or more second layer object boundary features, one or more fusion weights; and determine the one or more fused object class and one or more object boundary features based on the one or more fusion weights.

13. The apparatus of claim 8, wherein the executable instructions, when executed by the one or more processors, cause the apparatus to:

send, to the third layer, the one or more second layer object class features; and send, to the first layer, the one or more second layer object boundary features.

14. The apparatus of claim 8, wherein the executable instructions, when executed by the one or more processors, cause the apparatus to:

store and/or send the hierarchy-based segmentation data to enable access by one or more of a video conferencing service, a smart home service, an Internet-of-Things (IoT) service, or an autonomous driving service.

15. One or more non-transitory computer-readable media storing executable instructions that, when executed, cause an apparatus to at least:

determine, for a second layer of a hierarchy of neural networks, one or more initial object class features and one or more initial object boundary features;

determine, for the second layer, based on the one or more initial object class features and one or more third layer object class features received from a third layer of the hierarchy, one or more second layer object class features;

determine, for the second layer, based on the one or more initial object boundary features and one or more first layer object boundary features received from a first layer of the hierarchy, one or more second layer object boundary features;

determine, for the second layer, based on the one or more second layer object class features and the one or more second layer object boundary features, one or more fused object class and object boundary features;

determine, for the second layer, based on the one or more initial object class features and the one or more fused object class and object boundary features, segmentation data; and determine, based on the segmentation data and additional segmentation data associated with the second layer or the third layer, hierarchy-based segmentation data.

16. The one or more non-transitory computer-readable media of claim 15, wherein the neural networks include convolutional neural networks (CNNs).

17. The one or more non-transitory computer-readable media of claim 15, wherein the executable instructions, when executed, cause the apparatus to:

determine, based on the one or more third layer object class features and the one or more initial object class features, one or more object class feature weights; and determine the one or more second layer object class features based on the one or more object class feature weights.

18. The one or more non-transitory computer-readable media of claim 15, wherein the executable instructions, when executed, cause the apparatus to:

determine, based on the one or more second layer object boundary features and the one or more initial object boundary features, one or more object boundary feature weights; and determine the one or more second layer object boundary features based on the one or more object boundary feature weights.

19. The one or more non-transitory computer-readable media of claim 15, wherein the executable instructions, when executed, cause the apparatus to:

determine, based on the one or more second layer object class features and the one or more second layer object boundary features, one or more fusion weights; and determine the one or more fused object class and one or more object boundary features based on the one or more fusion weights.

20. The one or more non-transitory computer-readable media of claim 15, wherein the executable instructions, when executed, cause the apparatus to:

send, to the third layer, the one or more second layer object class features; and send, to the first layer, the one or more second layer object boundary features.

* * * * *